(12) United States Patent
Hoffmann et al.

(10) Patent No.: US 8,887,447 B2
(45) Date of Patent: Nov. 18, 2014

(54) FLEXIBLE STRUCTURES FOR USE WITH DOCK SEALS AND SHELTERS

(71) Applicants: David J. Hoffmann, Peosta, IA (US); Charles J. Digmann, Dubuque, IA (US); Timothy J. Schmidt, Dubuque, IA (US)

(72) Inventors: David J. Hoffmann, Peosta, IA (US); Charles J. Digmann, Dubuque, IA (US); Timothy J. Schmidt, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 13/633,622

(22) Filed: Oct. 2, 2012

(65) Prior Publication Data

US 2013/0031853 A1   Feb. 7, 2013

Related U.S. Application Data

(63) Continuation of application No. 12/820,811, filed on Jun. 22, 2010, now Pat. No. 8,307,588, which is a continuation of application No. 10/982,618, filed on Nov. 4, 2004, now Pat. No. 7,757,442.

(51) Int. Cl.
| | |
|---|---|
| *E04B 1/34* | (2006.01) |
| *B65G 69/00* | (2006.01) |
| *E06B 3/80* | (2006.01) |
| *E04B 1/62* | (2006.01) |
| *E06B 9/00* | (2006.01) |

(52) U.S. Cl.
CPC ............... *B65G 69/008* (2013.01); *E04B 1/62* (2013.01); *E06B 3/80* (2013.01); *E06B 9/00* (2013.01)

USPC .......................................... 52/2.12; 52/173.2

(58) Field of Classification Search
CPC ............... E04B 1/62; E04B 1/94; E04B 1/66; E04B 1/34; E06B 9/00; E06B 3/30; E06B 3/80; E06B 3/6715; E04H 14/00
USPC .................... 52/2.12, 173.2, 173.1
See application file for complete search history.

(56) References Cited

U.S. PATENT DOCUMENTS

| | | |
|---|---|---|
| 391,096 A | 10/1888 | Stover |
| 845,863 A | 3/1907 | Erickson |

(Continued)

FOREIGN PATENT DOCUMENTS

| | | |
|---|---|---|
| CH | 0600117 | 6/1978 |
| DE | 2239483 | 2/1974 |

(Continued)

OTHER PUBLICATIONS

Frommelt, "Foam-Fit Dock Seal with TechSteel Backer," 1999, 4 pages.

(Continued)

*Primary Examiner* — Phi A
(74) *Attorney, Agent, or Firm* — Hanley, Flight & Zimmerman, LLC

(57) ABSTRACT

Flexible structures for use with dock seals and shelters are disclosed. An example flexible structure includes a rigid backer to couple a flexible panel assembly to a loading dock wall and a flexible, self-supporting sheet-shaped member having sufficient rigidity to enable the flexible sheet-shaped member to be cantilevered from a surface of a building without substantial sagging. The sheet-shaped member has an inner surface and an outer surface defining a first longitudinal edge and a second longitudinal edge where the first and second longitudinal edges couple to the rigid backer. The inner surface defines an empty cavity when the sheet-shaped member is coupled to the rigid backer.

21 Claims, 24 Drawing Sheets

(56) References Cited

U.S. PATENT DOCUMENTS

| | | | |
|---|---|---|---|
| 866,791 A | 9/1907 | Keown | |
| 2,892,463 A | 6/1959 | Frommelt et al. | |
| 3,181,205 A | 5/1965 | Frommelt et al. | |
| 3,212,126 A | 10/1965 | Ruiz | |
| 3,303,615 A | 2/1967 | O'Neal | |
| 3,352,314 A | 11/1967 | Frommelt et al. | |
| 3,391,503 A | 7/1968 | O'Neal | |
| 3,403,489 A * | 10/1968 | Frommelt et al. | 52/173.2 |
| 3,500,599 A | 3/1970 | Sciolino | |
| 3,557,508 A | 1/1971 | Frommelt et al. | |
| 3,613,324 A | 10/1971 | Conger | |
| 3,638,667 A | 2/1972 | Frommelt et al. | |
| 3,683,572 A | 8/1972 | Alten | |
| 3,714,745 A | 2/1973 | O'Neal | |
| 3,772,839 A | 11/1973 | Timbers | |
| 3,792,559 A | 2/1974 | Frommelt et al. | |
| 3,854,257 A | 12/1974 | Lobel | |
| 3,875,954 A | 4/1975 | Frommelt et al. | |
| 3,915,183 A | 10/1975 | Frommelt | |
| 3,939,614 A | 2/1976 | Frommelt et al. | |
| 3,994,103 A | 11/1976 | Oullet | |
| 4,020,607 A | 5/1977 | Bjervig | |
| 4,044,510 A | 8/1977 | O'Neal | |
| 4,045,925 A | 9/1977 | O'Neal | |
| 4,062,157 A * | 12/1977 | Potthoff | 52/173.2 |
| 4,070,801 A | 1/1978 | O'Neal | |
| 4,213,279 A | 7/1980 | Layne | |
| 4,238,910 A | 12/1980 | O'Neal | |
| 4,262,458 A | 4/1981 | O'Neal | |
| 4,322,923 A | 4/1982 | O'Neal | |
| 4,359,846 A | 11/1982 | Votteler | |
| 4,365,452 A | 12/1982 | Fillman et al. | |
| 4,389,821 A | 6/1983 | O'Neal | |
| 4,516,366 A | 5/1985 | Alten | |
| 4,638,612 A * | 1/1987 | Bennett | 52/173.2 |
| 4,679,364 A | 7/1987 | Fettig et al. | |
| 4,711,059 A | 12/1987 | Layne | |
| 4,718,207 A | 1/1988 | Frommelt | |
| 4,724,648 A | 2/1988 | Diepholder | |
| 4,750,299 A | 6/1988 | Frommelt et al. | |
| 4,799,341 A | 1/1989 | Frommelt et al. | |
| 4,799,342 A * | 1/1989 | Klevnjans | 52/173.2 |
| 4,805,362 A | 2/1989 | Frommelt et al. | |
| 4,821,468 A | 4/1989 | Moore | |
| 4,825,607 A | 5/1989 | Frommelt et al. | |
| 4,854,258 A | 8/1989 | Hausmann et al. | |
| 4,873,800 A | 10/1989 | Frommelt et al. | |
| 4,916,870 A | 4/1990 | Moore | |
| 5,007,211 A | 4/1991 | Ouellet | |
| 5,037,685 A | 8/1991 | Richards et al. | |
| 5,125,196 A | 6/1992 | Moody | |
| 5,167,101 A * | 12/1992 | Alten | 52/173.2 |
| 5,185,977 A | 2/1993 | Brockman et al. | |
| 5,282,342 A | 2/1994 | Brockman et al. | |
| 5,341,613 A | 8/1994 | Brockman et al. | |
| 5,345,733 A | 9/1994 | Brockman et al. | |
| 5,394,662 A | 3/1995 | Giuliani et al. | |
| 5,407,632 A | 4/1995 | Constantino et al. | |
| 5,473,846 A | 12/1995 | Giuliani et al. | |
| 5,533,234 A | 7/1996 | Bizek | |
| 5,553,424 A | 9/1996 | Brockman et al. | |
| 5,622,016 A | 4/1997 | Frommelt et al. | |
| 5,953,868 A | 9/1999 | Giuliani et al. | |
| 5,965,238 A | 10/1999 | Saitoh et al. | |
| 6,014,844 A | 1/2000 | Thill | |
| 6,272,799 B1 | 8/2001 | Ashelin et al. | |
| 6,276,098 B1 | 8/2001 | Berends et al. | |
| 6,654,976 B2 | 12/2003 | Digmann et al. | |
| 6,948,285 B2 | 9/2005 | Miller et al. | |
| 6,948,440 B2 | 9/2005 | Aschenbach | |
| 7,254,922 B2 * | 8/2007 | Brockman et al. | 52/173.2 |
| 7,757,442 B2 | 7/2010 | Hoffmann et al. | |
| 8,307,588 B2 | 11/2012 | Hoffmann et al. | |
| 2002/0110423 A1 | 8/2002 | Miller et al. | |
| 2002/0112418 A1 * | 8/2002 | Thill et al. | 52/173.2 |
| 2004/0020141 A1 | 2/2004 | Borgerding | |
| 2004/0134139 A1 * | 7/2004 | Busch et al. | 52/173.2 |
| 2005/0102929 A1 * | 5/2005 | Hoffmann et al. | 52/173.2 |
| 2006/0090407 A1 | 5/2006 | Hoffmann et al. | |
| 2010/0251639 A1 | 10/2010 | Hoffmann et al. | |

FOREIGN PATENT DOCUMENTS

| | | |
|---|---|---|
| DE | 2436518 | 8/1975 |
| EP | 0379634 | 8/1990 |
| EP | 1457443 | 9/2004 |
| JP | 5179837 | 7/1993 |
| JP | 6081427 | 3/1994 |
| WO | 8102604 | 9/1981 |
| WO | 0264908 | 8/2002 |

OTHER PUBLICATIONS

Frommelt, "Four Ways to Cut Your Costs and Boost Your Profits," Eliminator Series, published Feb. 2002, 6 pages.

Frommelt, "TPL-903," published 1996, 1 page.

Frommelt, "Weather-Guard Dock Shelters Model 402," published May 2001, 2 pages.

Presray Pawling, "Pneuma-Seal Inflatables," Oct. 2003, 1 page.

Presray, "Pneuma-Seal," Poduct Line Brochure, 1998, 16 pages.

Sealmaster, "Inflatable Seals," Mar. 5, 2002, 8 pages.

"Topic 4.7: Beams-Bending Stress," retrieved from http://physics.uwstout.edu/StatStr/statics/Beams/bdsn47.htm Jul. 4, 2004, 3 pages.

"Pure Bending," retrieved from http://em-ntserver.unl.edu/NEGAHBAN/Em325/11-Bending/Bending.htm, Jul. 4, 2004, 4 pages.

International Searching Authority, "Written Opinion of the International Searching Authority," issued in connection with international application serial No. PCT/US2005/039803, mailed Aug. 28, 2006, 11 pages.

International Searching Authority, "International Search Report," issued in connection with international application serial No. PCT/US2005/039803, mailed Aug. 28, 2006, 9 pages.

International Bureau, "International Preliminary Report on Patentability," issued in connection with international application serial No. PCT/US2005/039803, issued May 8, 2007, 12 pages.

European Patent Office, "Office Action," issued in connection with European application serial No. 05 826 268.4, issued Dec. 7, 2009, 3 pages.

Canadian Intellectual Property Office, "Office Communication," issued in connection with Canadian application serial No. 2,584,801, issued Dec. 23, 2008, 4 pages.

Canadian Intellectual Property Office, "Notice of Allowance," issued in connection with Canadian application serial No. 2,584,801, issued Nov. 16, 2009, 1 page.

United States Patent and Trademark Office, "Notice of Allowance," issued in connection with U.S. Appl. No. 10/982,618, mailed Mar. 9, 2010, 21 pages.

United States Patent and Trademark Office, "Final Office Action," issued in connection with U.S. Appl. No. 10/982,618, mailed Jul. 30, 2009, 22 pages.

United States Patent and Trademark Office, "Non-Final Office Action," issued in connection with U.S. Appl. No. 10/982,618, mailed Oct. 6, 2008, 13 pages.

United States Patent and Trademark Office, "Final Office Action," issued in connection with U.S. Appl. No. 10/982,618, mailed Apr. 2, 2008, 26 pages.

United States Patent and Trademark Office, "Non-Final Office Action," issued in connection with U.S. Appl. No. 10/982,618, mailed Jun. 4, 2007, 20 pages.

United States Patent and Trademark Office, "Issue Notification," issued in connection with U.S. Appl. No. 10/982,618, mailed Jun. 30, 2010, 1 page.

United States Patent and Trademark Office, "Interview Summary," issued in connection with U.S. Appl. No. 10/982,618, mailed Dec. 8, 2009, 3 pages.

United States Patent and Trademark Office, "Interview Summary," issued in connection with U.S. Appl. No. 10/982,618, mailed Dec. 11, 2007, 3 pages.

(56) References Cited

OTHER PUBLICATIONS

United States Patent and Trademark Office, "Restriction Requirement," issued in connection with U.S. Appl. No. 10/982,618, mailed Feb. 9, 2007, 6 pages.

European Patent Office, "Decision to Grant," issued in connection with European application serial No. 05826268.4, issued Aug. 23, 2012, 1 page.

European Patent Office, "Intention to Grant," issued in connection with European application serial No. 05826268.4, issued Apr. 26, 2012, 7 pages.

State Intellectual Property Office P.R. China, "Notification to Grant Patent Right for Invention," issued in connection with Chinese application serial No. 200580045716.2, issued May 23, 2012, 2 pages.

State Intellectual Property Office P.R. China, "First Office Action," issued in connection with Chinese application serial No. 200580045716.2, issued Sep. 9, 2011, 15 pages.

European Patent Office, "Office Communication," issued in connection with European application serial No. 05826268.4, issued Jun. 9, 2011, 3 pages.

United States Patent and Trademark Office, "Supplemental Notice of Allowance," issued in connection with U.S. Appl. No. 12/820,811, mailed Oct. 9, 2012, 3 pages.

United States Patent and Trademark Office, "Notice of Allowance," issued in connection with U.S. Appl. No. 12/820,811, mailed Jun. 25, 2012, 16 pages.

United States Patent and Trademark Office, "Final Office Action," issued in connection with U.S. Appl. No. 12/820,811, mailed Sep. 15, 2011, 11 pages.

United States Patent and Trademark Office, "Non-Final Office Action," issued in connection with U.S. Appl. No. 12/820,811, mailed Nov. 4, 2010, 19 pages.

United States Patent and Trademark Office, "Non-Final Office Action," issued in connection with U.S. Appl. No. 12/820,811, mailed Feb. 16, 2012, 13 pages.

Intellectual Property Office of Hong Kong, "Decision to Grant," issued in connection with Hong Kong application serial No. 08101952.6, issued Feb. 20, 2013, 4 pages.

\* cited by examiner

FLEXIBLE STRUCTURES FOR USE WITH DOCK SEALS AND SHELTERS

CROSS-SECTION OF RELATED APPLICATIONS

This Patent arises from a continuation of U.S. application Ser. No. 12/820,811, filed Jun. 22, 2010, entitled "Flexible Structures for Use with Dock Seals and Shelters," which is a continuation of U.S. patent application Ser. No. 10/982,618, filed on Nov. 4, 2004, entitled "Flexible Structures for Use with Dock Seals and Shelters," both of which are incorporated herein by reference in their entireties.

FIELD OF THE DISCLOSURE

The present disclosure relates generally to flexible structures and, more specifically, to flexible structures that may be used with dock seals and/or shelters.

BACKGROUND

In general, dock seals and shelters address the need to prevent the ingress of outdoor environmental conditions or contaminants (e.g., rain, snow, wind, hot/cold temperatures, insects, animals, etc.) into the interior of a building (e.g., the dock area) and cargo area of a vehicle during the loading or unloading of the vehicle. Dock shelters and seals also address the need to prevent the egress of conditioned air from within a building and/or a vehicle cargo area to the outdoor environment. The design of dock seals and shelters that effectively isolate the interior space of a building and adjacent vehicle cargo area from the outdoor environment is complicated by the fact that vehicles (e.g., the trailer or rear portion of a truck) may not be centered relative to the seal or shelter when backed into the seal or shelter. As a result, dock seals and shelters are typically designed to compensate for some range of off-center vehicle positions within which the functionality of the seal or shelter is not compromised. Further, the structures of a seal or shelter, particularly side members, are desirably capable of recovering from repeated impacts from the rear portions of off-center vehicles without sustaining substantial permanent deformation.

Some known dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and may provide desirable aesthetic qualities. Additionally, a header structure may span between the side members along a top portion of the loading dock opening. The header structure may be another compressible member similar in construction to the side members and, in some cases, may include a weighted fabric curtain that hangs downwardly to contact the top of a truck trailer to form an environmental barrier along the top of the trailer.

Another type of dock seal uses inflatable side members and a header structure having internal compressible resilient pads, which provide some degree of side member compressibility when the side members are in a deflated condition. In either case, when the rear portion of a vehicle (e.g., a truck trailer) is backed into either foam or inflatable dock seal side and header members, the side and header members are compressed toward the building wall to form a seal along the lateral and top back edges of the vehicle. If present, the head curtain sweeps along the top of the trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals are susceptible to power losses and tears that compromise the ability of the side members to inflate to provide an acceptable seal.

In contrast to dock seals, some known dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members, which are often referred to as side curtains, extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

In contrast to dock seals, dock shelters typically provide unobstructed access to a vehicle cargo area opening (i.e., there are no foam pads or the like to be compressed and displaced into the opening). However, most known dock shelter side members are constructed using rigid wood, fiberglass or metal frames capable of supporting the significant weight of the seal members or side curtains, which are usually held at an appreciable distance (e.g., several feet) from the building wall. Such side members may be permanently deformed if they are impacted by a vehicle. Accordingly, bumpers or stops may be mounted to the lower edge of the dock shelter to prevent a vehicle (e.g., a truck trailer) from impacting and damaging the rigid shelter.

The rigid side members used to implement these known dock shelters are also typically mechanically coupled via the header and/or another rigid member to provide increased lateral rigidity to the dock shelter to minimize the ability of the side members to move from side-to-side. Because of this, the side members typically have to be mounted relatively far apart to accommodate a wide range of possible off-center vehicle positions. This relatively large distance between the rigid side members consumes a significant and, thus, expensive amount of building wall space for each loading dock opening.

More recently, dock shelters having impactable side members have been developed. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover to its original condition or shape.

While dock shelters having compressible foam side members provide the advantages of unobstructed access to a truck trailer opening (at least when the side members are not impacted) and the ability to withstand repeated impacts from off-center vehicles, these more recent dock shelter designs still have some drawbacks. For example, the foam cores of the side members must be made relatively wide and bulky to support their own weight and the weight of the side seals or curtains. Also, the relatively bulky foam cores needed are expensive, difficult to mount to the wall surface and consume a significant amount of building wall space. In addition, the inherent structural characteristics of the foam core and fabric combination significantly limit the permissible weight of the side curtains and/or the distance at which the side curtains can be mounted from the wall without causing the side members to sag an unacceptable and perceptible amount.

DETAILED DESCRIPTION

Figure 1:
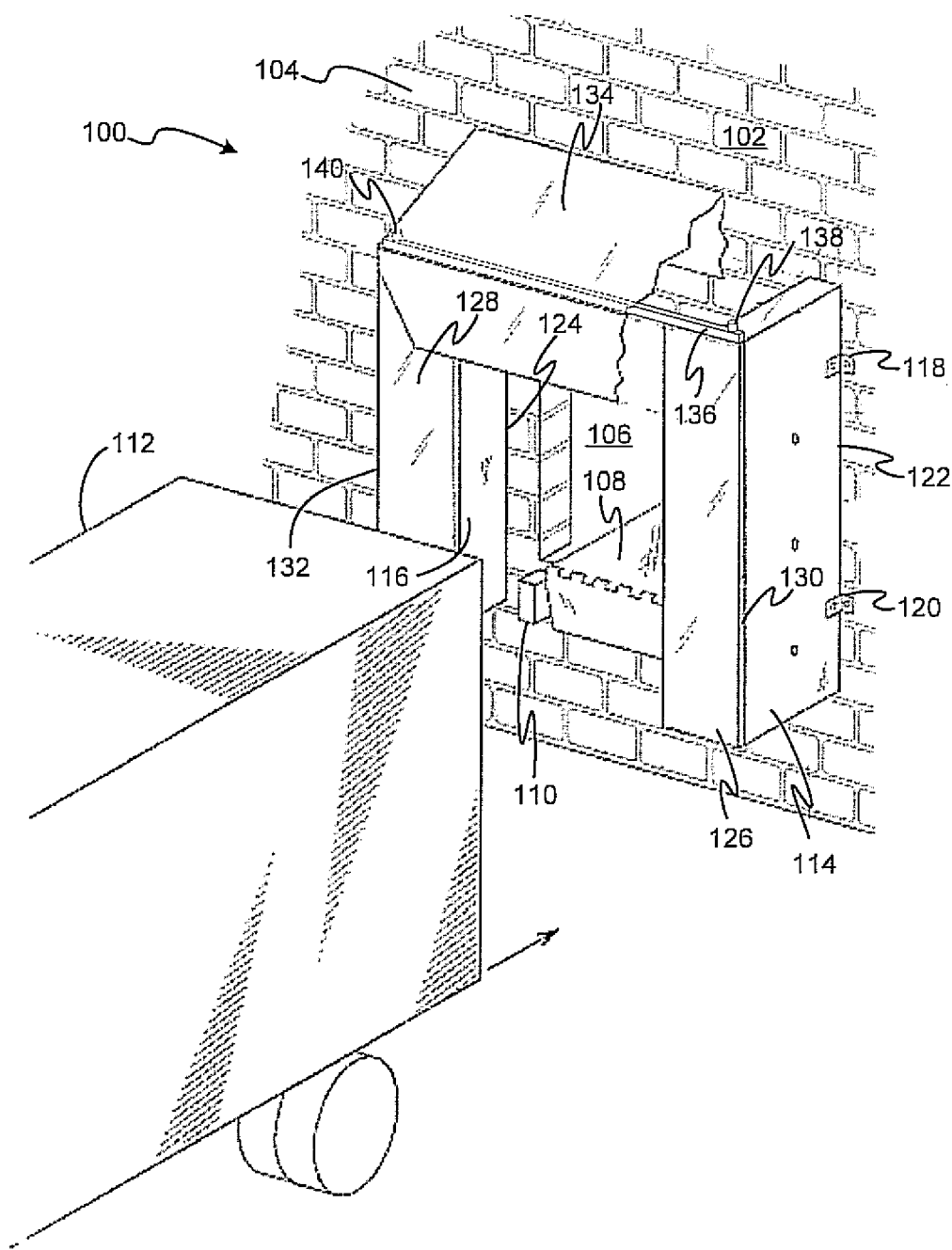
FIG. 1 depicts an example dock shelter that may be implemented using the flexible structures disclosed herein.

In general, the example flexible structures disclosed herein may be used to implement loading dock seals and/or impactable loading dock shelters. More specifically, the example flexible structures disclosed herein may be used as flexible side members and/or header structures having sufficient structural rigidity to support their own weight without any substantial (e.g., appreciable or perceptible (e.g., by an unaided human eye)) sagging when cantilevered over an appreciable distance (e.g., two to several feet or more) from the wall of a building. Additionally, the flexible structures described herein provide sufficient rigidity to support, without substantial (e.g., unacceptable perceptible) sagging, the additional weight of side seals or curtains or other similar structures held at an appreciable distance from the wall of the building. Still further, the example flexible structures described herein are configured to withstand and recover from repeated impacts from the rear portions of off-center vehicles and/or lateral impacts from these or other sources.

In some examples, and in contrast to the compressible bodies (e.g., foam pads or bodies) used to implement known flexible side members and other structures, the flexible structures described herein are implemented using a flexible thin-walled or sheet-like member. More specifically, the flexible thin-walled or sheet-like member is configured to have a cross-sectional geometry that provides sufficient rigidity to enable the flexible structures to be cantilevered out an appreciable distance from a wall surface without any substantial (e.g., appreciable or visually perceptible (e.g., with the unaided human eye)) sagging of the flexible structures. Although in some cases, there may be visually perceptible sagging, such sagging may nevertheless not be appreciable or substantial in that the operation of the flexible structures described herein is not adversely affected. The cross-sectional geometry of the thin-walled or sheet-like member may correspond to a non-planar shape and/or may define a moment of inertia that enables a flexible structure to have a substantial rigidity along its longitudinal axis and to be substantially flexible along its transverse axis. The flexible thin-walled or sheet-like member may provide sufficient inherent rigidity to the flexible structures so that foam cores or other compressible bodies, pressurized air cavities, or other rigidity enhancing structures are not needed within the flexible structures to prevent unacceptable sagging of the flexible structures when cantilevered from a building wall.

As used herein, the terms "thin-walled structure" and "thin-walled member" relate to a structural element or elements that may, for example, be composed of a sheet-shaped or sheet-like material, combination of materials (e.g., a composite material), or assembly. In contrast to foam cores or other known compressible bodies commonly used to form flexible structures, the material composing the structural element(s) of a thin-walled structure or member has a thickness that is relatively small compared to the overall dimensions of the thin-walled structure or member formed thereby. For example, some example thin-walled structures disclosed herein may be several feet in length and width and may be formed using a sheet-like material a fraction of an inch thick. Also, the structural element(s) is/are formed to have (or otherwise caused to have) a desired cross-sectional geometry. For example, curved cross-sectional geometries such as an S-shaped or C-shaped geometry may be used. Alternatively, substantially rectilinear cross-sectional geometries such as T-shaped geometries, V-shaped geometries, polygonal (e.g., rectangular) geometries, etc. could be used instead. Additionally, a thin-walled structure or member may be substantially unitary and, thus, may be composed of a single piece of material or, alternatively, may be composed of multiple pieces and/or layers of material.

The desired flexibility and rigidity characteristics of the example flexible structures described herein may be achieved using sheet-shaped members or the like having a geometry in which the mass centroid of the sheet-shaped member in a planar condition (i.e., before becoming part of the non-planar flexible structure) is sufficiently distant from the mass centroid of the finished non-planar flexible structure. The distance between these different mass centroids is commonly referred to as the moment of inertia of the non-planar structure. In general, as the moment of inertia increases, the rigidity of the non-planar structure increases. Such an effect can be clearly understood by first imagining a piece of thick paper in a planar condition. With the paper standing on one of its edges, the moment of inertia of the planar piece of paper is zero because the center of mass of the planar structure formed by the paper and the center of mass of the paper itself pass through the same point. Now, if the paper is formed into a non-planar structure such as a tube, the center of mass of the tube and the center of mass of the paper itself are separated by distance (i.e., moment of inertia) equal to the about radius of the tube. As can be appreciated, the rigidity of the tube (or non-planar structure) along its longitudinal axis is substantially greater than that of the paper in a planar condition.

The example flexible structures described herein may also provide substantial lateral flexibility, which may be especially advantageous in loading dock shelter applications. In particular, in some loading dock shelter applications, flexible side members may be mechanically coupled via linking member such as, for example, a tie-bar, tie-rod, a rope, a rubber strap, etc. so that if a backing vehicle contacts and causes a lateral displacement of one of the flexible side members, the opposing flexible side member is laterally displaced in substantially the same direction and substantially the same amount. Such a mechanical coupling of the flexible side members facilitates the ability of a dock shelter to flexibly accommodate or adapt to a relatively wide range of off-center vehicle positions within which the ability of the dock shelter to maintain an environmental barrier between the outdoor environment and the interior space of a building and the vehicle cargo area is not compromised.

Now turning to FIG. 1, an example dock shelter 100 which may be implemented using any of the example flexible structures disclosed herein is shown. The example dock shelter 100 is fixed to an outside surface 102 of a building wall 104 adjacent to the sides and/or top of a loading dock opening 106. A dock leveler 108 may protrude from the loading dock opening 106 in a conventional manner. Stops or bumpers 110 (only one of which is shown) may prevent a truck trailer 112 from being backed too far into the shelter 100 and damaging the wall 104 and/or compromising the operation of the dock leveler 108.

The dock shelter 100 includes elongate flexible side members 114 and 116 that are fixed or attached to the wall 104 via brackets 118 and 120 (only two of which are shown) or via any other suitable fastener(s). As shown in FIG. 1, the elongate flexible side members 114 and 116 are fastened to the wall 104 along respective longitudinal edges 122 and 124 so that the side members 114 and 116 extend substantially perpendicularly from the wall 104 and so that the side members 114 and 116 are cantilevered out over an appreciable distance (e.g., two or more feet) from the outside surface 102 of the wall 104.

Flexible seal members or side curtains 126 and 128 are attached to respective longitudinal edges 130 and 132 of the flexible side members 114 and 116. The side curtains 126 and 128 project inwardly substantially parallel to the wall 104 across at least a portion of the loading dock opening 106 and in an interfering relationship with the intended path of the truck trailer 112. The flexible side curtains 126 and 128 may be implemented using known side curtain structures such as, for example, curtains having flexible fiberglass stays covered with a coated fabric, vinyl, or any other suitable material. Alternatively, as described in greater detail below, the flexible side curtains may be implemented using other flexible structures.

In the illustrated example, a header structure or head curtain 134 extends between the flexible side members 114 and 116 along the top portion of the loading dock opening 106. The header structure 134 is configured to seal (i.e., to provide an environmental barrier) along the top portion of the trailer 112 when the trailer 112 is backed into shelter 100. The header structure 134 may be implemented using any conventional or known header structures or head curtains. Alternatively, the header structure or head curtain 134 may be implemented using flexible structures similar to those used to implement the flexible side members 114 and 116, examples of which are described in greater detail below.

In addition to being fastened to the wall 104, the flexible side members 114 and 116 may be mechanically coupled via a linking member 136 such as, for example, a tie-rod or tie-bar type structure. By mechanically coupling the side members 114 and 116 in this manner, the substantially laterally flexible side members 114 and 116 can compensate for a relatively wide range of off-center positions of the trailer 112. In particular, if the trailer 112 contacts and causes lateral displacement of one of the side members 114 and 116, the linking member 136 causes the other one of the side members 114 and 116 (and the side curtains 126 and 128) to be laterally displaced (e.g., horizontally or side-to-side with respect to the dock opening 106) in substantially the same direction substantially the same amount. The substantial lateral flexibility of the mechanically coupled side members 114 and 116 enables the side members 114 and 116 to be spaced closer to one another and/or the side curtains 126 and 128 to made smaller relative to the side member spacing and side curtain dimensions used with known dock shelters having substantially rigid side members.

The linking member 136 may be implemented using a tube or bar made of any desired material (e.g., metal, wood, plastic, etc.) having any desirable cross-sectional geometry (e.g., square, circular, etc.) Pins 138 and 140 may be welded or otherwise fixed to the ends of the linking member 136. The pins 138 and 140 are configured to pivotally engage with the side members 114 and 116. For example, the pins 138 and 140 may extend through a substantially circular opening in tabs or brackets (not shown) fixed to the side members 114 and 116. However, the linking member 136 may be implemented in any desired manner to cause the side members 114 and 116 to move laterally in substantially the same direction substantially the same amount. For example, the linking member 136 could be implemented using a rope, a piece of fabric, a rubber strap, a piece of plastic, etc. Alternatively, the linking member 136 could be implemented using a telescoping spring-loaded rod (e.g., in retractive tension), which would tend to force the flexible side curtains 126 and 128 against the sides of a truck trailer.

Figure 2:
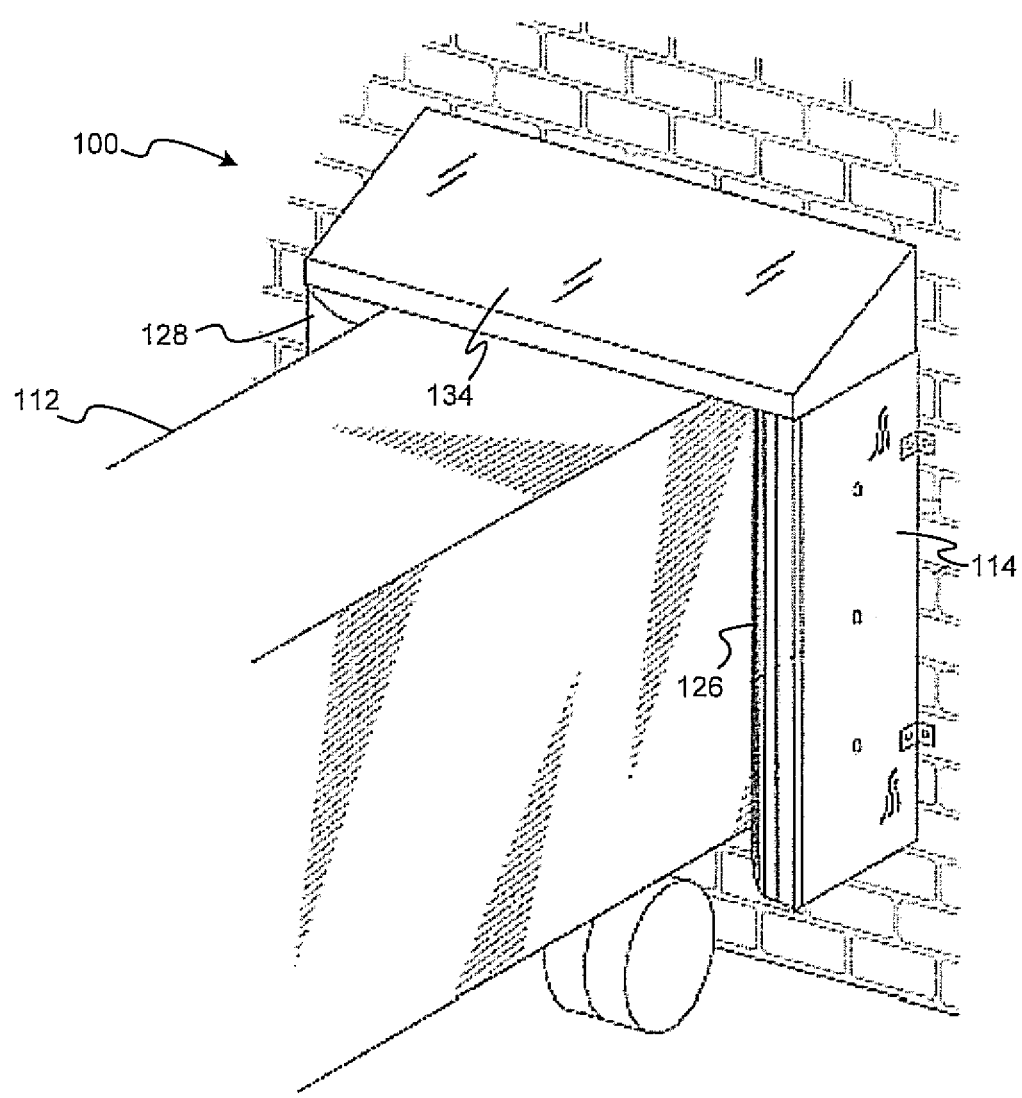
FIG. 2 depicts a vehicle engaging the example dock shelter of FIG. 1.

FIG. 2 depicts the manner in which the truck trailer 112 may be properly backed into the example dock shelter 100 in a substantially centered location relative to the dock opening 106. As shown in FIG. 2, the side curtains 126 and 128 have been flexibly displaced by the sides of the trailer 112 toward the dock opening 106 (FIG. 1) and their respective flexible side members 114 and 116 (FIG. 1). As a result, an environmental barrier or seal is formed between the sides of the trailer 112 and the side curtains 126 and 128. Additionally, a downwardly extending portion of the header structure or head curtain 134 is displaced upwardly and back toward the opening 106 to form an environmental barrier or seal along the top portion of the trailer 112.

Figure 3:
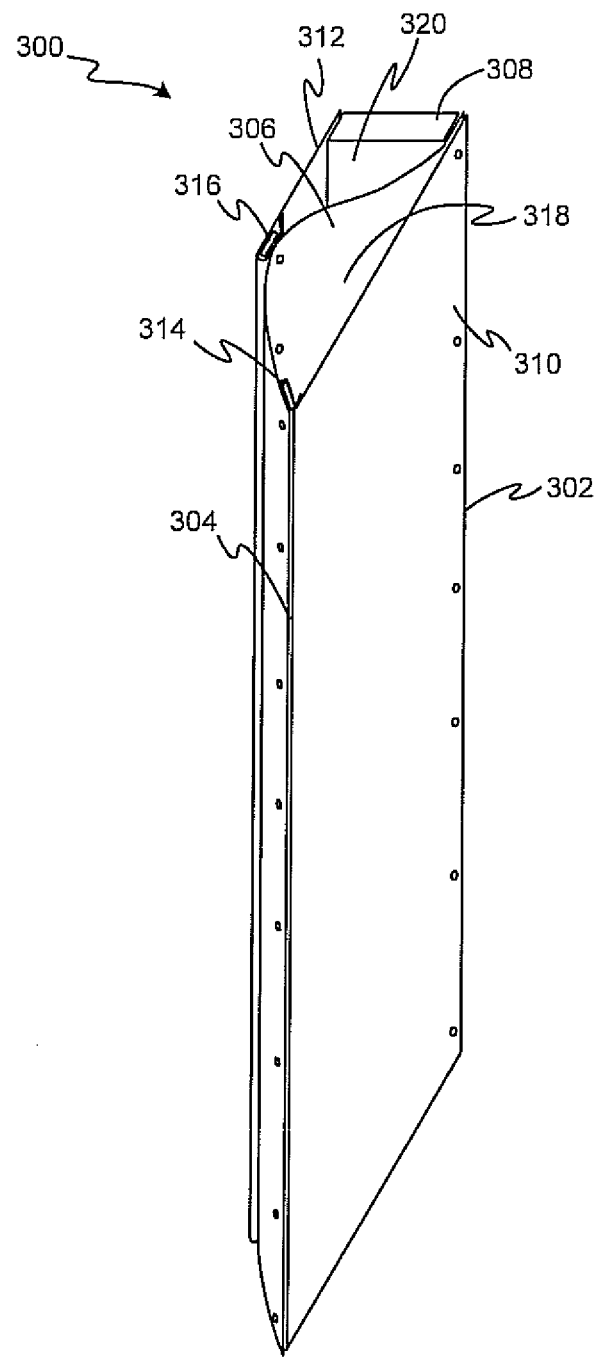
FIG. 3 depicts an example flexible structure that may be used to implement the side members of the example dock shelter of FIG. 1.

FIG. 3 depicts an example flexible structure 300 that may be used to implement the side members 114 and 116 of the example dock shelter 100 of FIG. 1. In general, the flexible structure 300 is configured to be an elongate flexible panel assembly having first and second longitudinal edges 302 and 304 and at least one flexible thin-walled or sheet-shaped member 306. Also, the flexible thin-walled member 306 is configured to have a cross-sectional geometry that provides sufficient rigidity to enable the elongate flexible panel assembly or structure 300 to be cantilevered from a surface (e.g., the wall surface 102 shown in FIG. 1) via the first longitudinal edge 302 without substantial deformation of the cross-sectional geometry of the at least one flexible thin-walled member 306. The cross-sectional geometry of the flexible thin-walled member 306 provides sufficient rigidity to the flexible structure 300 so that the flexible structure 300 does not sag (e.g., the longitudinal edge 304 does not shift downward relative to the edge 302) a substantial (e.g., appreciable, visually perceptible, etc.) amount when the flexible structure 300 is cantilevered over an appreciable distance from a wall surface (e.g., the wall surface 102).

The flexible thin-walled member 306 may be made of a substantially unitary (i.e., one piece) flexible sheet of polymeric or metallic material that has been pre-formed (e.g., via heat treatment, a molding operation, etc.) or that is held (e.g., in tension) to have the aforementioned cross-sectional geometry. In some applications, the flexible thin-walled member 306 may be made of a high molecular weight polyethylene or the like. However, other materials could alternatively be used.

The thickness of the flexible thin-walled member 306 may be selected to suit the needs of a particular application. In some applications a thickness of 0.125" may be suitable, whereas other applications may require a greater thickness and still other applications may be implemented using a lesser thickness. The flexible thin-walled member 306 is attached to an elongate rigid member or backer structure 308, which may be made of a wood (e.g., pressure treated lumber), a composite and/or a metallic material suitable for attachment to, for example, an outside wall of a building.

As noted above, the cross-sectional geometry of the flexible thin-walled member 306 defines a thin-walled structure having substantial rigidity along its longitudinal axis to prevent any appreciable sagging of the flexible structure 300 when cantilevered out an appreciable distance from a building wall. Additionally, the cross-sectional geometry of the flexible thin-walled member 306 results in substantial resilient flexibility along the transverse axis of the flexible structure 300 to enable the flexible structure 300 to withstand (i.e., recover without substantial permanent deformation due to) repeated impacts, compressions, etc. (e.g., forcing the second longitudinal edge 304 toward the first longitudinal edge 302) from a rear portion of truck trailer or the like. The structure can also withstand lateral impacts (forcing the edge 304 to move laterally relative to the edge 302) without substantial permanent deformation. The cross-sectional geometry of the flexible thin-walled member 306 is generally non-planar (e.g., curved) and defines a moment of inertia as described generally above that provides sufficient rigidity to enable the flexible structure 300 to be used as a side member of a loading dock or the like without any substantial (e.g., appreciable or visually perceptible) sagging of the flexible structure 300.

Further flexible members 310 and 312 may be coupled to the backer 308 and the flexible thin-walled member 306. One or both of the flexible members 310 and 312 may be used to increase the torsional rigidity and/or to control the orientation of the flexible thin-walled member 306 when the flexible structure 300 is mounted to a wall. For example, one or both of the flexible members 310 and 312 may be configured to hold the flexible thin-walled member 306 in a substantially perpendicular (or other desired angular) relationship to a wall surface (e.g., the wall surface 102 of FIG. 1).

In the example of FIG. 3, the flexible members 310 and 312 are depicted as being sheet-shaped members and, in such a case, may be made from a woven material such as a coated fabric or may be made of any other suitable flexible sheet-like material such as neoprene, vinyl or any suitable thermoplastic material, elastomeric material, etc. In cases where the flexible thin-walled member 306 is not pre-formed to define the desired cross-sectional geometry, the flexible member 310 may be used to hold (e.g. in tension) the flexible thin-walled member 306 to have the desired shape or cross-sectional geometry. More specifically, as depicted in the example of FIG. 3, the flexible member 310 may be configured to be tensioned between the longitudinal edges 302 and 304 to hold the flexible thin-walled member 306 to define a substantially C-shaped, S-shaped or other curvilinear cross-sectional geometry.

While the flexible members 310 and 312 are depicted as sheet-like structures that cover substantially entire respective sides of the structure 300, various other configurations of the flexible members 310 and 312 could be used instead. For example, one or both of the flexible members 310 and 312 could be implemented using multiple strips or sections of material spaced along the longitudinal axis of the structure 300. Further, the flexible members 310 and 312 could be implemented using one or more flexible rubber straps, fiberglass stays, etc. instead of or in addition to sheet-shaped members to perform a similar or identical function.

Any desired combination of mechanical and/or chemical fasteners may be used to assemble the structural members depicted in the example flexible structure 300 of FIG. 3. For example, the flexible thin-walled member 306 and the flexible members 310 and 312 may be coupled or attached to the backer 308 using nails, rivets, adhesives, lag screws, snaps/buttons, and/or any other fastening mechanism suitable to hold the structures to the backer 308. Washers, perforated metal straps or brackets, and/or other load distributing components may be employed to prevent damaging the flexible members 306, 310 and 312 during assembly and/or to prevent premature failure (e.g., ripping, cracking, tearing, etc.) of the members 306, 310 and 312 during extended use of the structure 300. In the example of FIG. 3, a bracket 314 is used to fasten (e.g., using nuts and bolts) the leading edges of the thin-walled flexible member 306 and the flexible member 310. Similarly, a perforated metal bracket or strap 316 and nuts and bolts are used to couple or attach the flexible member 312 to the thin-walled flexible member 306.

As shown in the example of FIG. 3, the flexible structure 300 defines cavities 318 and 320. One or more compressible members such as, for example, foam structures or the like may be disposed in one or both of the cavities 318 and 320 (an example a compressible member 502 located in cavity 320 is shown clearly in FIG. 5) to further increase the rigidity of the flexible structure 300. In addition, one or more such compressible members may be disposed in one or both of the cavities 318 and 320 to provide additional resilience and/or shape restorative force to facilitate the ability of the flexible structure 300 to return to its original shape following an impact from, for example, a truck trailer.

Figure 4:
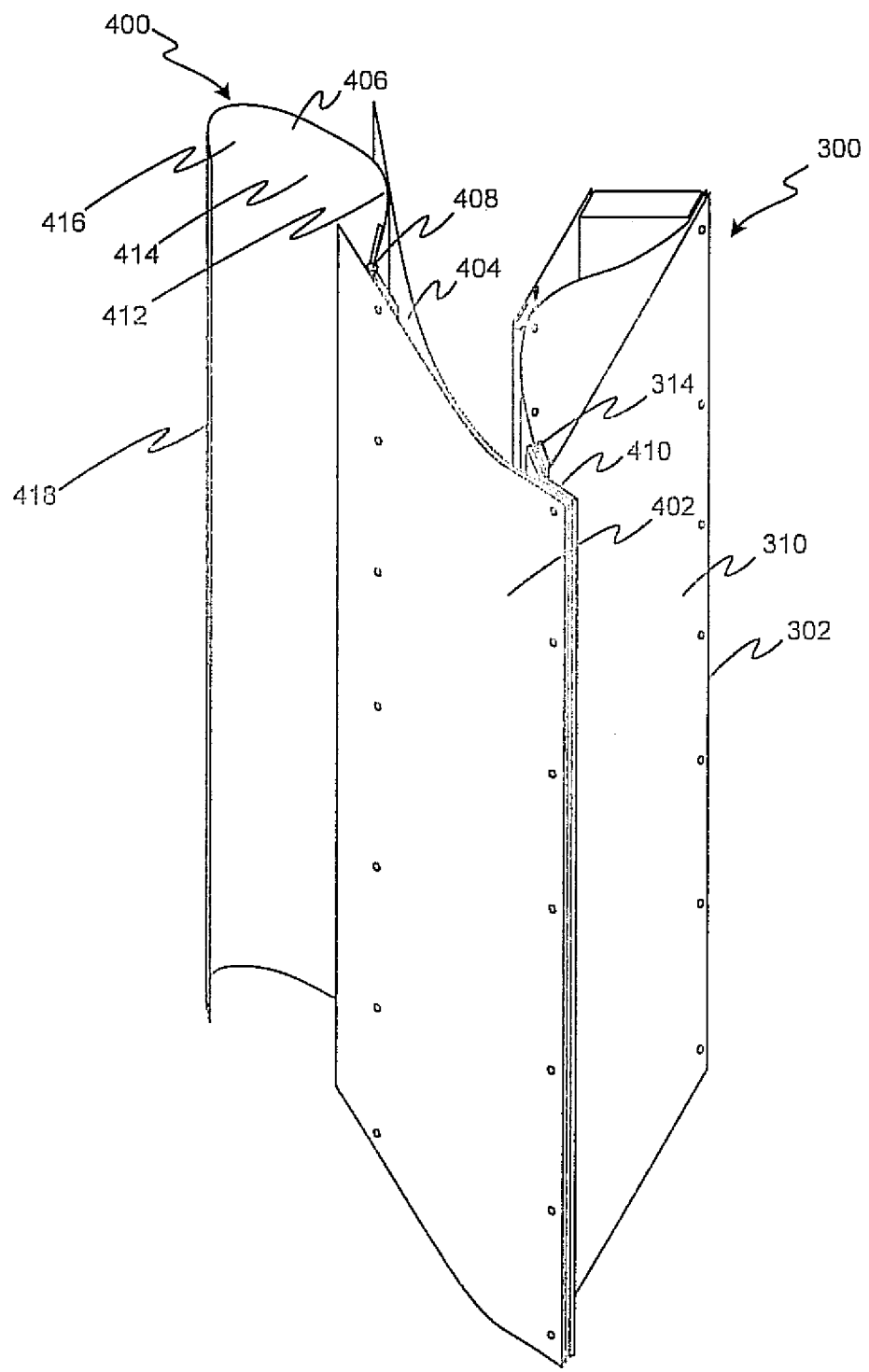
FIG. 4 depicts another example flexible structure being employed as a seal member or side curtain with the example flexible structure of FIG. 3.

FIG. 4 depicts another flexible structure 400 that may be used as a side seal or side curtain assembly with the example flexible structure 300 of FIG. 3. In general, the example flexible structure or side curtain assembly 400 includes a first flexible member or panel 402, a second flexible member or panel 404 and a hinge gap cover or hook 406. The hinge gap cover or hook 406 is flexibly or movably coupled to the first flexible member 402 via a hinge 408 or any other mechanism that enables the hinge gap cover 406 to move or articulate relative to the first flexible member 402.

The first and second flexible members 402 and 404 are fixed or coupled to the flexible structure 300 via a bracket 410, which may be bolted, riveted, or otherwise fastened to the bracket 314. The first flexible member 402 is configured to cover the hinge 408 and to flexibly sweep against the side of a backing vehicle (e.g., the truck trailer 112 shown in FIG. 1). The second flexible member 404 is configured to bias the first flexible member 402 and the hinge gap cover 406 outward (i.e., away from the first longitudinal edge 302) so that the first flexible member 402 and the hinge gap cover 406 are positioned in the intended path of a backing vehicle.

The first and second flexible members 402 and 404 may be made of a substantially unitary sheet-like material such as, for example, a polymeric or metallic material. One particularly useful material is high molecular weight polyethylene. However, other flexible materials and configurations could be used instead. For example, the second flexible member 404 could be implemented using one or more flexible fiberglass, plastic, or metallic stays. Further, the first flexible member 402 could be implemented using one or more flexible stays covered with a coated fabric or any other suitable material. The hinge gap cover or hook 406 may be made from an elastomeric material, polymeric material, etc. suitable for repeated flexible engagement with the rear lateral side edges of a vehicle such as, for example, the truck trailer 112 (FIG. 1).

The hinge gap cover or hook 406 is configured to engage a relatively wide range of vehicle types (e.g., trailer types). In particular, the hinge gap cover or hook 406 may be curved or shaped to accommodate a trailer having relatively thick back edges or side walls and access doors such as, for example, a refrigerated trailer. The hinge gap cover 406 may also accommodate trailers having thinner back edges and access doors. In the illustrated example, the hinge gap cover 406 has a first curved portion 412, a relatively linear or non-curved portion 414 and a second curved portion 416. The curvatures associated with the first and second curved portions 412 and 416 may have identical, similar, or different shapes as needed to suit a particular application or range of applications.

While the example hinge gap cover or hook 406 is depicted in FIG. 4 as being coupled to the flexible member 402 via the hinge 408, other manners of coupling the example hinge gap cover or hook 406 shown in FIG. 4 could be used instead. For example, the hinge gap cover or hook 406 could be directly attached (i.e., without a hinge) to the flexible member 402 using any suitable fastening mechanism (e.g., screws, nuts and bolts, adhesive, heat staking, ultrasonic welding, rivets, etc.) Alternatively or additionally, the hinge gap cover or hook 406 could be made integral (e.g., using a single piece of material or multiple pieces of material) with the flexible member 402. In the case of a single piece of material (i.e., a unitary construction), the flexible member 402 may be made longer (i.e., to extend further inwardly toward the shelter or dock opening) and an inner portion of the flexible member 402 may be formed (e.g., via heat treatment) to have substantially the shape of the example hinge gap cover or hook 406.

Regardless of the manner in which the hinge gap cover or hook 406 is implemented, the hinge gap cover or hook 406 in combination with the flexible member 404 is configured to provide a self-adjusting operation to facilitate consistent engagement with rear trailer edges of different thicknesses. As is described in greater detail in connection with FIGS. 7D and 7E below, the hinge gap cover or hook 406 is configured to articulate and flex in a manner that enables a leading edge 418 of the cover or hook 406 to automatically and consistently engage the rear edge of a fully docked trailer in a manner that does not encroach on the cargo area of the trailer and substantially independent of the thickness of the rear edges of the trailer.

Figure 5:
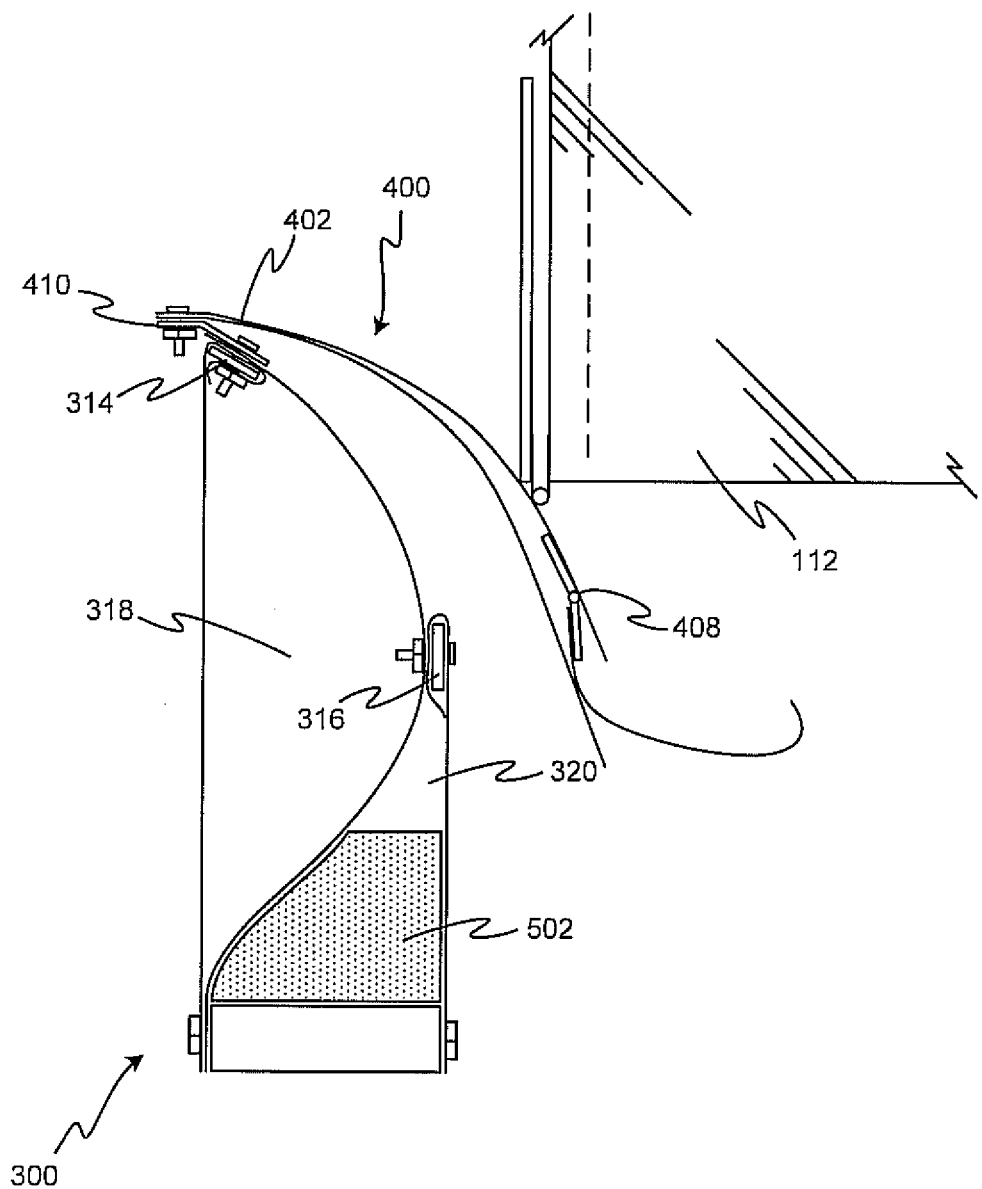
FIG. 5 is a cross-sectional view of the example flexible structures of FIG. 4.

FIG. 5 is a cross-sectional view of the example flexible structures 300 and 400 of FIG. 4. However, in the example of FIG. 5, a compressible member 502 (e.g., a foam structure or body) has been disposed within the cavity 320 to further increase the rigidity of the structure 300 and/or to impart additional resilience and/or shape restorative force thereto. The compressible member 502 may be configured to fill only a portion of or substantially all the cavity 320. In addition, the compressible member 502 may be composed of multiple pieces of compressible material and, in such a case, may be distributed within the volume of the cavity 320. Additionally or alternatively, one or more compressible members may be similarly disposed in the cavity 318. In the example of FIG. 5, the truck trailer 112 has backed into the side curtain 400 and has contacted the side curtain 400 at the first flexible member 402 adjacent to the hinge 408.

Figure 6:
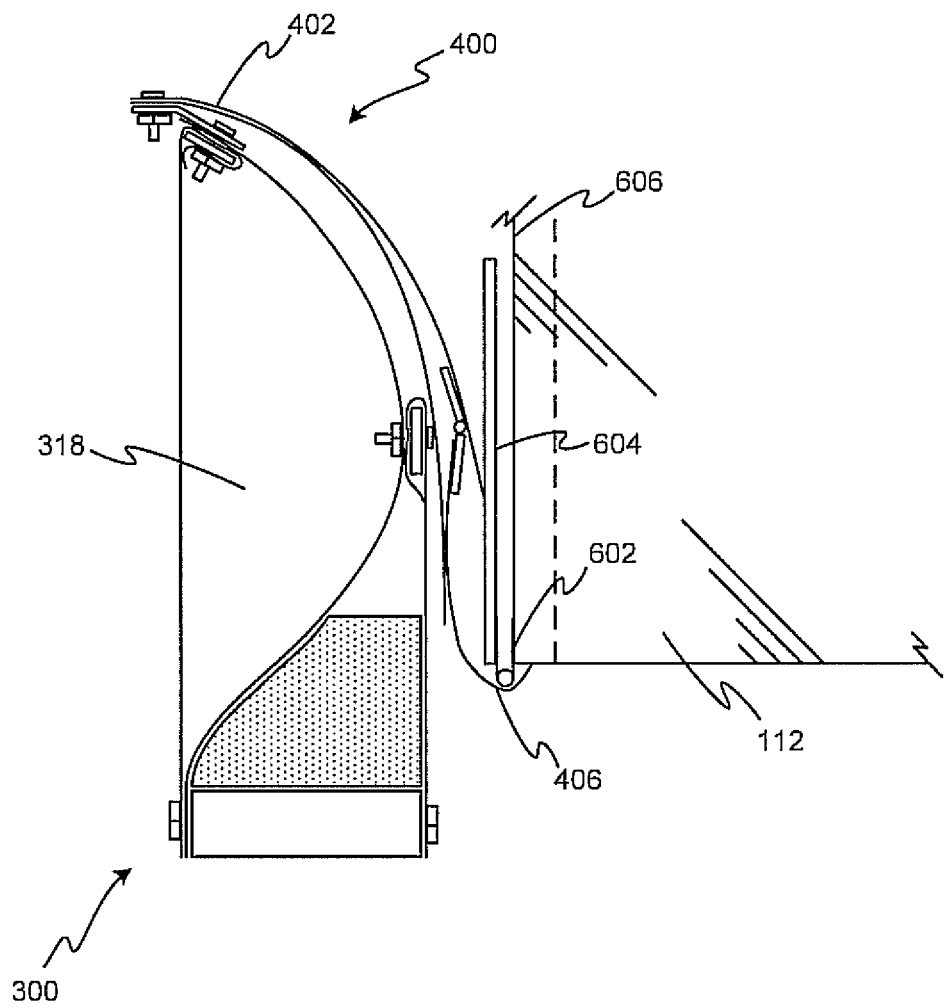
FIG. 6 is a cross-sectional view of the example flexible structures of FIG. 4 depicted in relation to a properly docked vehicle.

FIG. 6 is a cross-sectional view of the example flexible structures 300 and 400 of FIG. 5 depicted in relation to the truck trailer 112 docked substantially in the center of the dock opening 106 (FIG. 1). As can be seen in FIG. 6, the hinge gap cover 406 has engaged the rear edge of the truck trailer 112 to substantially cover a gap 602 between the side door 604 and the side 606 of the trailer 112. Additionally, the first flexible member 402 is engaged with the side 606 of the trailer 112 to form an additional environmental seal or barrier against the trailer 112.

Figure 7A:
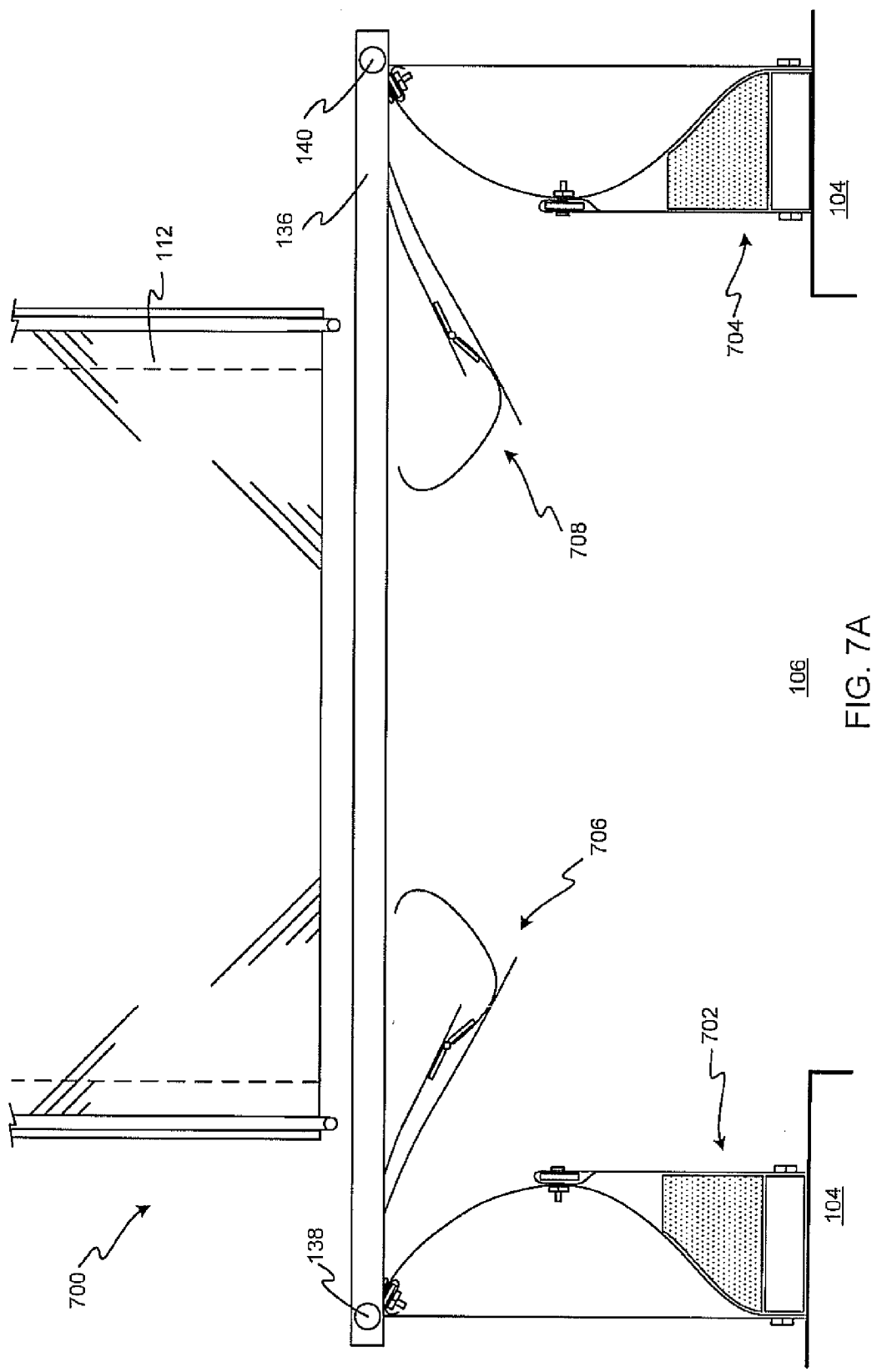
FIGS. 7A, 7B, and 7C illustrate one manner in which the substantial lateral flexibility of the example flexible structures of FIG. 4 may be used to accommodate a relatively wide range of off-center vehicle positions.

FIG. 7A depicts the trailer 112 in off-center relation to the dock opening 106 and a shelter 700 including opposing flexible side members 702 and 704 having respective side curtains 706 and 708. As discussed connection with FIG. 1, the flexible side members 702 and 704 are mechanically coupled via the linking member 136 and pins 138 and 140.

Figure 7B:
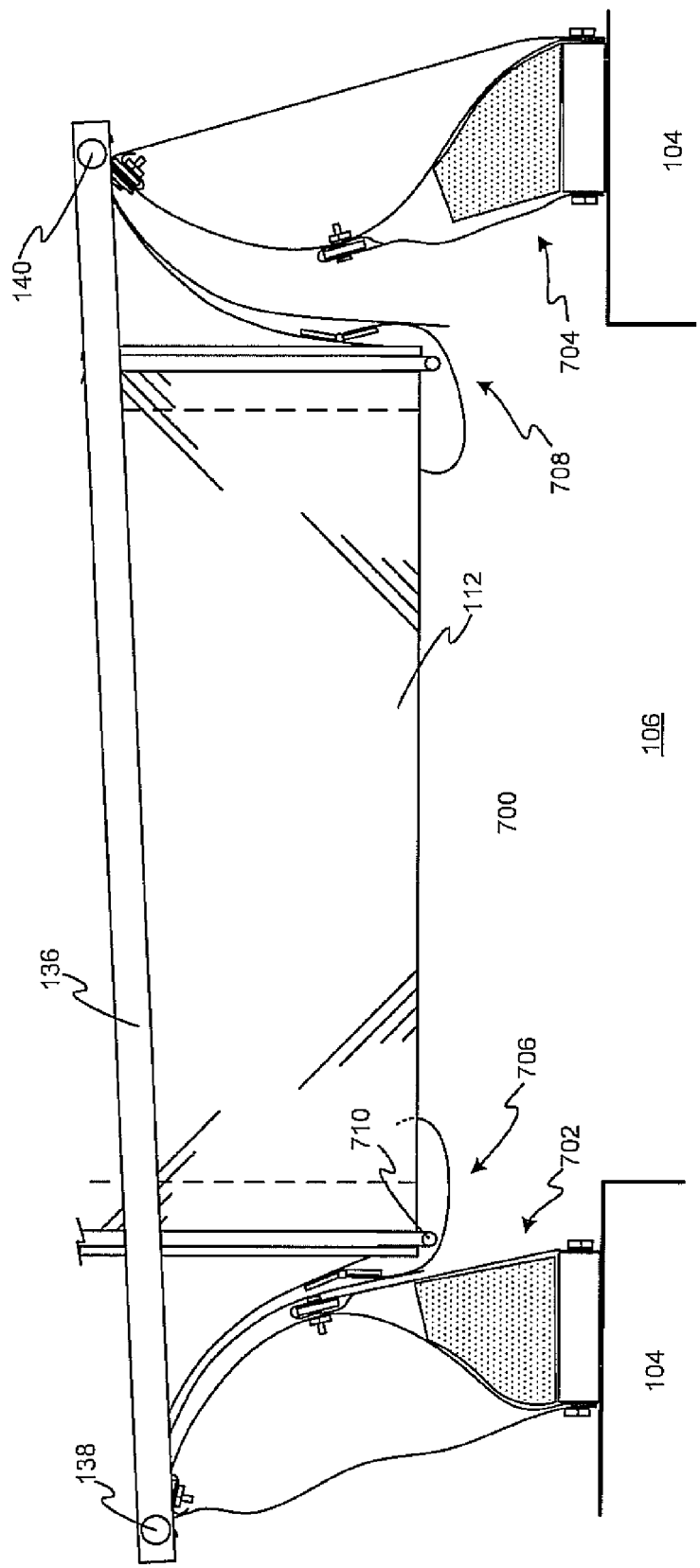

FIG. 7B depicts the manner in which the substantial lateral flexibility of the mechanically coupled side members 702 and 704 of the shelter 700 accommodates the off-center trailer 112. In particular, when an edge 710 of the trailer 112 contacts the side curtain 706, the flexible side member 702 and the side curtain 706 are displaced laterally away from the opening 106 which, via the linking member 136, causes the flexible side member 704 and the side curtain structure 708 to be displaced laterally toward the opening 106 an amount substantially equal to the amount the side member 702 and side curtain 706 are displaced away from the opening 106. Thus, while the path of the trailer 112 depicted in FIG. 7A suggests that the back edge of the trailer 112 may not engage the side curtain structure 708, the mechanical coupling of the flexible side members 702 and 704 causes the side curtain structure 708 to be displaced into the path of the trailer 112 when the trailer 112 contacts the side curtain structure 706.

Figure 7C:
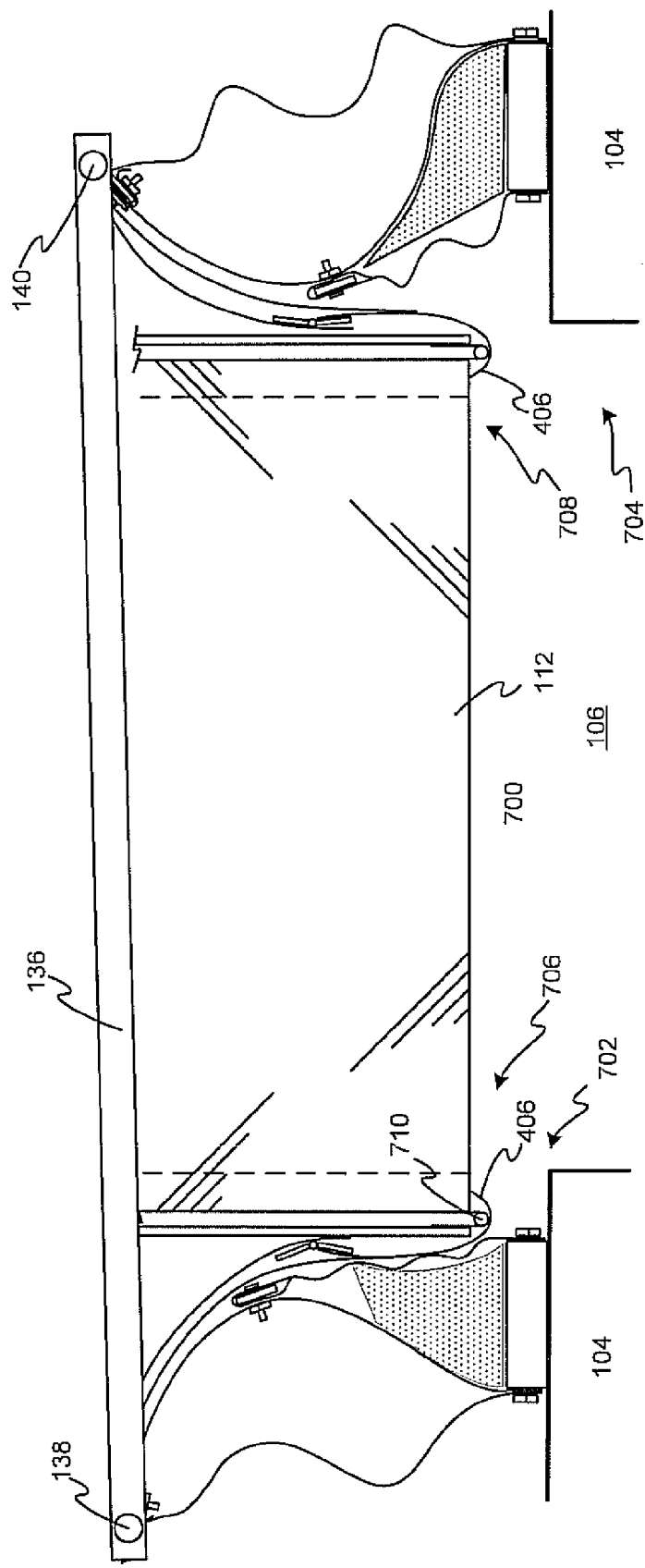

FIG. 7C depicts the trailer 112 in a fully docked condition. As shown in FIG. 7, when the trailer 112 is in a fully docked condition, the hinge gap covers or hooks 406 have engaged with the rear edge of the trailer 112 as depicted in greater detail in connection with FIGS. 7D and 7E.

Figure 7D:
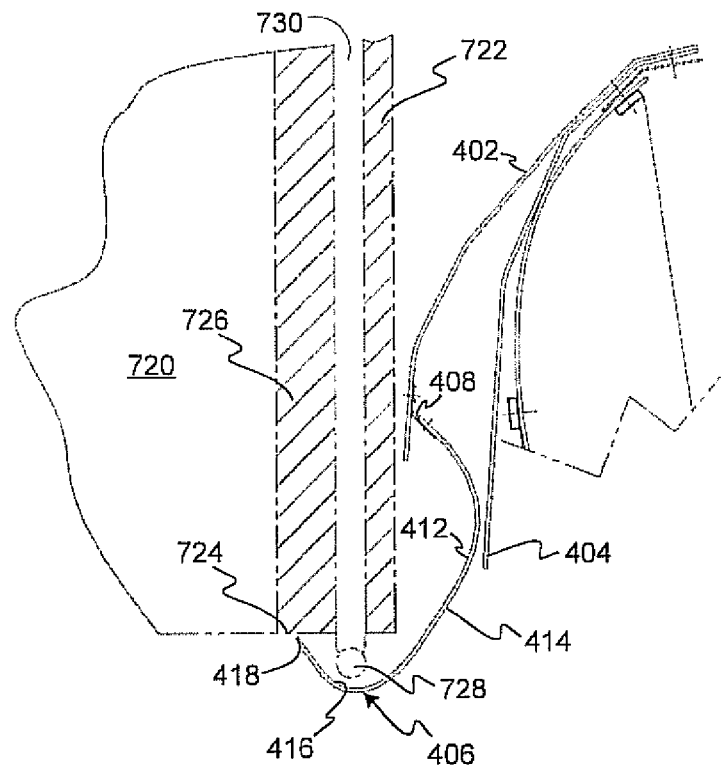
FIGS. 7D and 7E depict examples of the manner in which the hinge gap cover or hook of FIG. 4 may engage with the rear portion of a truck trailer.

FIG. 7D depicts an example manner in which the hinge gap cover or hook 406 engages a fully docked trailer 720 having a standard thickness trailer door 722. As depicted in the example of FIG. 7D, the edge 418 engages a rear surface 724 of a side 726 of the trailer 720 and, thus, does not encroach on the cargo area of the trailer 720. Further, the second curved portion 416 of the hook 406 covers a hinge 728 to minimize or prevent the ingress of outdoor environmental conditions and/or the egress of conditioned building air into the outdoor environment through a gap 730 between the trailer door 722 and the side 726 of the trailer 720. As can be seen from FIG. 7D, the geometry of the hook 406 and the manner in which the hook 406 can articulate with respect to the flexible member 402 (via, for example, the hinge 408) enables the edge 418 of the hook 406 to automatically engage or seal against the rear surface 724 as the trailer 720 moves to a fully docked condition.

Figure 7E:
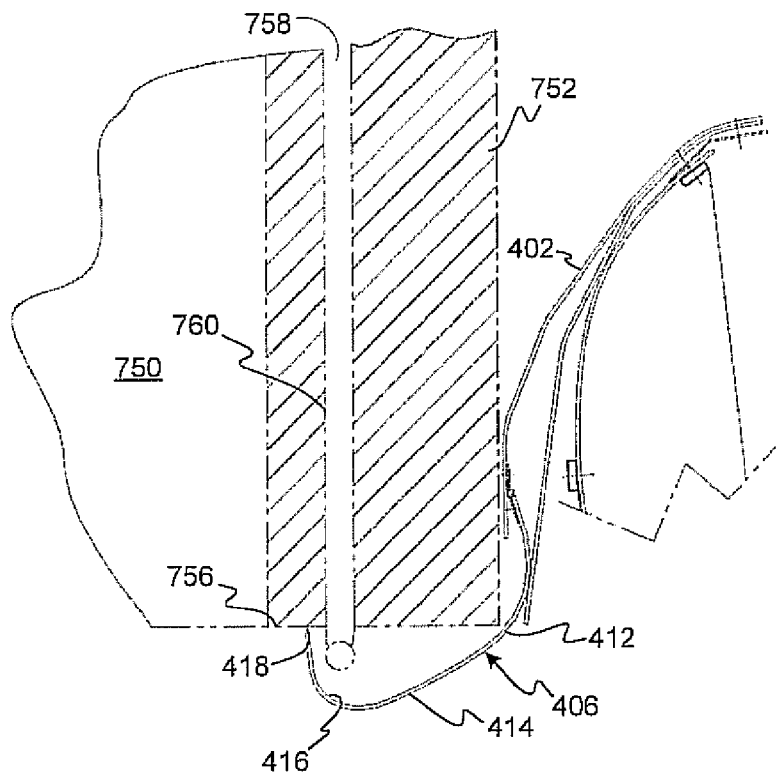

FIG. 7E depicts an example manner in which the hinge gap cover or hook 406 engages a fully docked trailer 750 having a relatively thick trailer door 752 (e.g., as is the case with many refrigerated trailers). As can be seen from FIG. 7E, the relatively linear or non-curved portion 414 extends over the thickness of the door 752 so that the edge 418 of the hook 406 seals against a rear surface 756 of the trailer 750. Thus, despite the significantly greater thickness of the door 752 in comparison to the standard thickness door 722 of FIG. 7D, the hinge gap cover or hook 406 forms an environmental barrier with respect to a gap 758 between the door 752 and a side 760 of the trailer 750.

Figure 8:
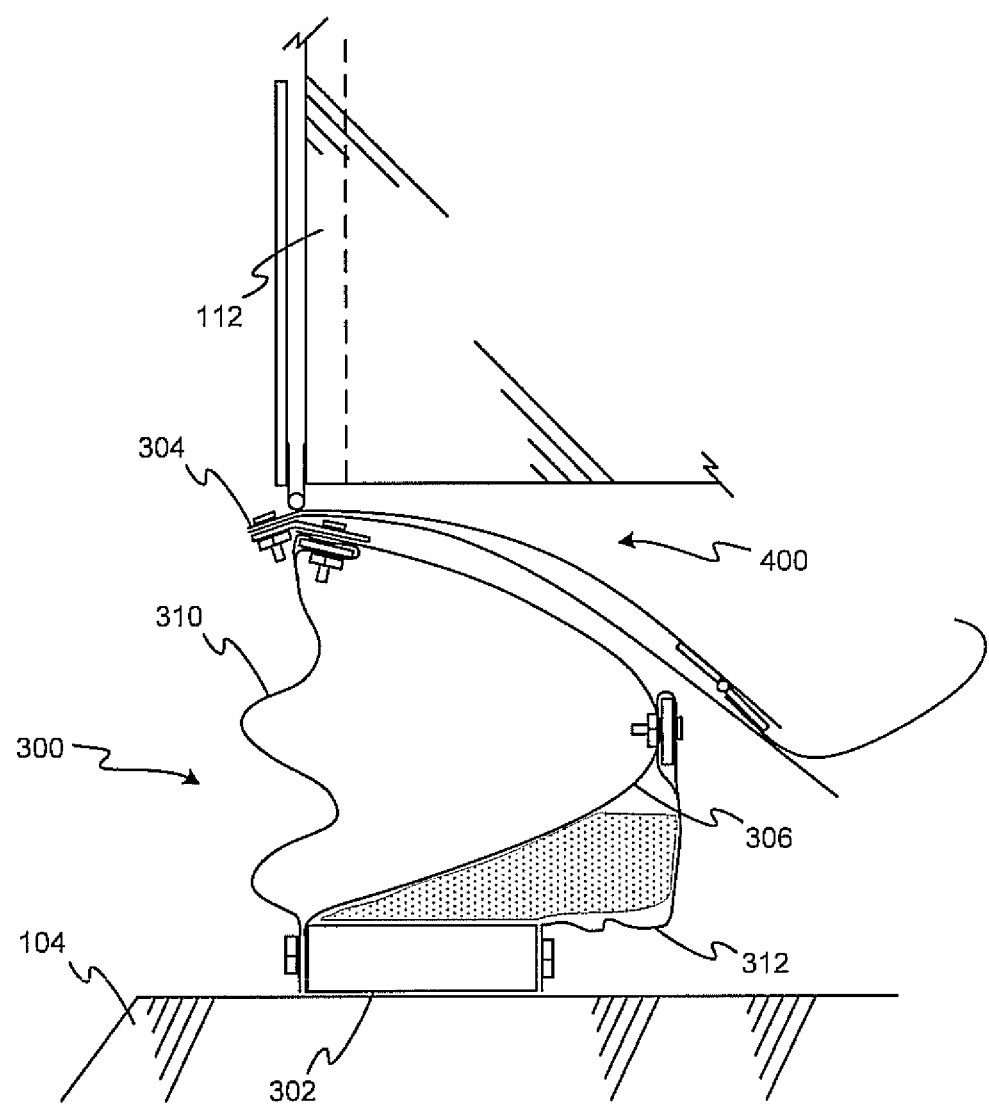
FIG. 8 is a cross-sectional view of the example flexible structures in FIG. 4 depicted in a condition in which a vehicle has impacted the flexible structures.

FIG. 8 is a cross-sectional view of the example flexible structures 300 and 400 of FIG. 4 depicted in a condition in which the truck trailer 112 has impacted the flexible structures 300 and 400. As can be seen in FIG. 8, the flexible thin-walled member 306 has been displaced toward the wall 104. As a result, the flexible members 310 and 312 have become slack or bunched between the first and second longitudinal edges 302 and 304. When the truck trailer 112 is pulled away from the impacted structures 300 and 400, the structures 300 and 400 will return to their original condition without any substantial permanent deformation to the flexible structures 300 and 400 or the shapes and/or geometries formed thereby.

In addition to providing rigidity to the flexible structure 300, the shape or geometry of the flexible thin-walled member 306 may also control the impact response of the flexible structure 300. In particular, the example curvilinear (e.g., C-shaped or S-shaped) cross-sectional geometry of the thin-walled member 306 facilitates a controlled or orderly folding (e.g., in an accordion like fashion) of the thin-walled member 306 toward the wall 104. In this manner, the cross-sectional geometry of the thin-walled member 306 may be configured to prevent unpredictable displacements of the various structures making up the thin-walled member 306 during and following an impact. As mentioned previously, and as depicted in FIGS. 7B and 7C, the flexible structure 300 can also withstand and recover from lateral impacts without sustaining substantial permanent deformation.

Figure 9:
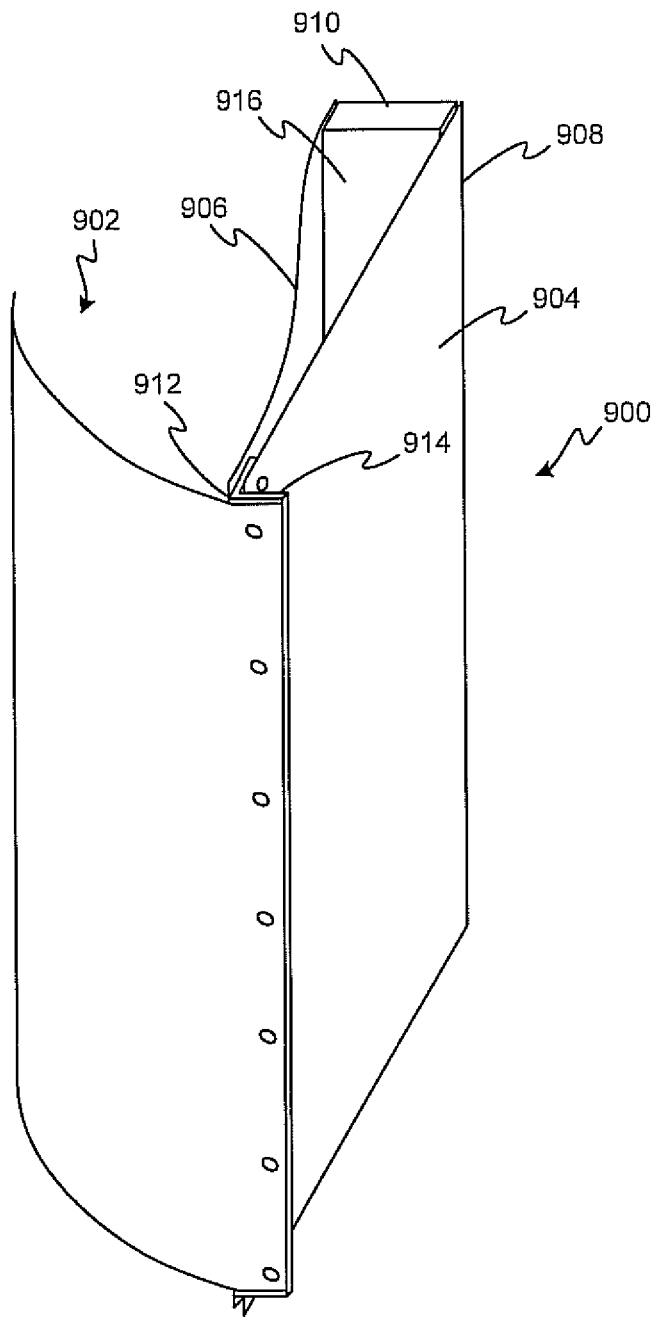
FIG. 9 depicts further examples of flexible structures that may be used to implement the side members and side curtains of the example dock shelter of FIG. 1.

FIG. 9 depicts further examples of flexible structures 900 and 902 that may be used to implement the side members 114 and 116 and side seals or side curtains 126 and 128 of the example dock shelter 100 of FIG. 1. In particular, the flexible structure 900 is a flexible panel or side member assembly and the flexible structure 902 is a side curtain or seal assembly. The flexible structure 900 includes first and second flexible side members or structures 904 and 906 that have been fixed along a first longitudinal edge 908 to opposing sides of a backer structure 910 and, at a second longitudinal edge 912, to a bracket 914. Each of the flexible side structures 904 and 906 may be made from a substantially unitary sheet of flexible material such as, for example, a polymeric material (e.g., polyethylene), a metallic material, an elastomeric material, or any other suitable flexible material.

Alternatively, one of both of the flexible side structures 904 and 906 could instead be made from multiple sections of flexible material spaced along the longitudinal edges 908 and 912. In that case, one or both of the flexible side members 904 and 906 may be covered with a coated fabric or other material(s) to substantially enclose a cavity 916 defined by the flexible side members 904 and 906. If desired, a compressible member (not shown) such as a foam structure, core or body may be disposed within the cavity 916 to increase the rigidity of and/or to impart additional resilience and/or shape restorative force to the flexible structure 900.

Further, the flexible structure 900 has a substantially rectilinear or V-shaped cross-sectional geometry that provides sufficient rigidity to enable the flexible structure 904 to support its own weight and the weight of the flexible structure 902 without any substantial (e.g., visually perceptible or appreciable) deformation or distortion of the cross-sectional geometry or shape of the flexible structure 900 when cantilevered over an appreciable distance from a building wall. Similar to the example flexible structure 300 of FIG. 3, the flexible structure 900 provides substantial rigidity along its longitudinal axis and substantial flexibility along its transverse axis. As a result, the flexible structure 900 can be repeatedly impacted either compressively or laterally by a vehicle or the like and return to its original shape or geometry without any substantial permanent deformation to the flexible structure 900.

The flexible structure or side curtain 902 may be coupled to the longitudinal edge 912 via the bracket 914 and, thus, may be bolted, riveted, or fastened to the bracket 914 in any other desired manner. The side seal 902 of the illustrated example has a generally curved shaped to facilitate its resilient engagement with the side of a backing vehicle such as, for example, the truck trailer 112 (FIG. 1).

Figure 10:
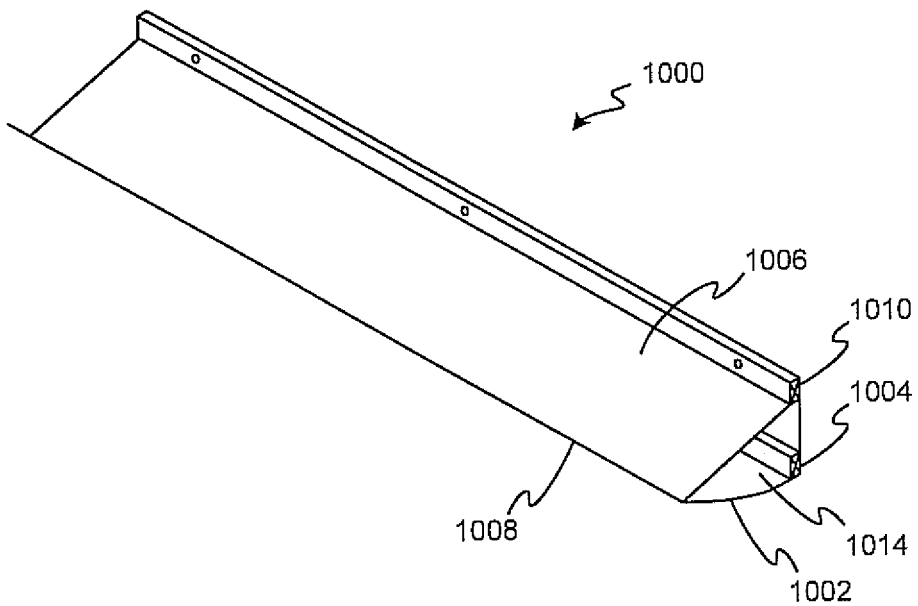
FIG. 10 depicts an example header structure that may be used to implement the example dock shelter of FIG. 1.
Figure 11:
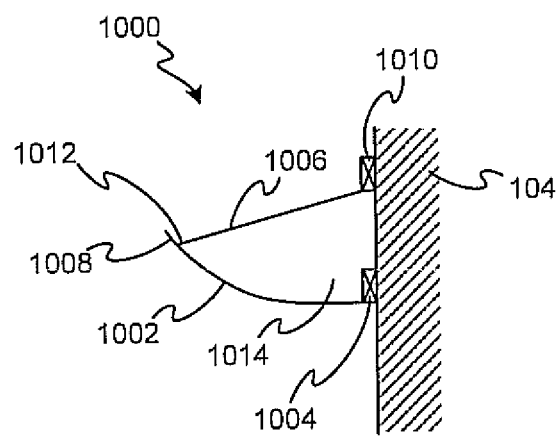
FIG. 11 is a cross-sectional view of the example header structure of FIG. 10.

FIGS. 10 and 11 depict an example header structure 1000 that may be used to implement the example dock shelter 100 of FIG. 1. The example header structure 1000 includes a flexible member 1002 which, in this example, is a substantially unitary sheet-shaped member such as, for example, a sheet of a flexible plastic material (e.g., a high molecular weight polyethylene). The flexible member 1002 is configured to be attached to the wall 104 via a first backer structure 1004, which may be an elongate bar-shaped structure made of wood, a metallic material, a composite material, or any other suitable material. A second flexible member 1006 extends between a leading edge 1008 of the header structure 1000 and a second backer structure 1010, which is used to fix the second flexible member 1006 to the wall 104. The second flexible member 1006 may be made of a coated fabric material or any other suitable flexible material.

The second flexible member 1006 may be used to hold (e.g., in tension) the first flexible member 1002 to have a substantially curvilinear profile. Alternatively, the first flexible member 1002 may be preformed completely or in part, in which case the second flexible member 1006 may provide little, if any, tensioning force to the first flexible member 1002. The first and second flexible members 1002 and 1006 may be attached along the leading edge 1008 via a bracket (not shown) and nuts/bolts, rivets, or any other suitable fastening mechanism(s). Additionally, a top edge 1012, which may be exposed to moisture such as rain, may be caulked or sealed with tape to prevent water from accumulating within a cavity 1014 of the structure 1000. If desired, one or more compressible members such as, for example, foam structures (not shown) may be disposed within the cavity 1014 to increase the rigidity and/or to impart additional resilience and/or shape restorative force to the structure 1000. Although not shown in FIGS. 10 and 11, a head curtain structure may also be suspended from the edge 1008 of the header structure 1000.

Figure 12:
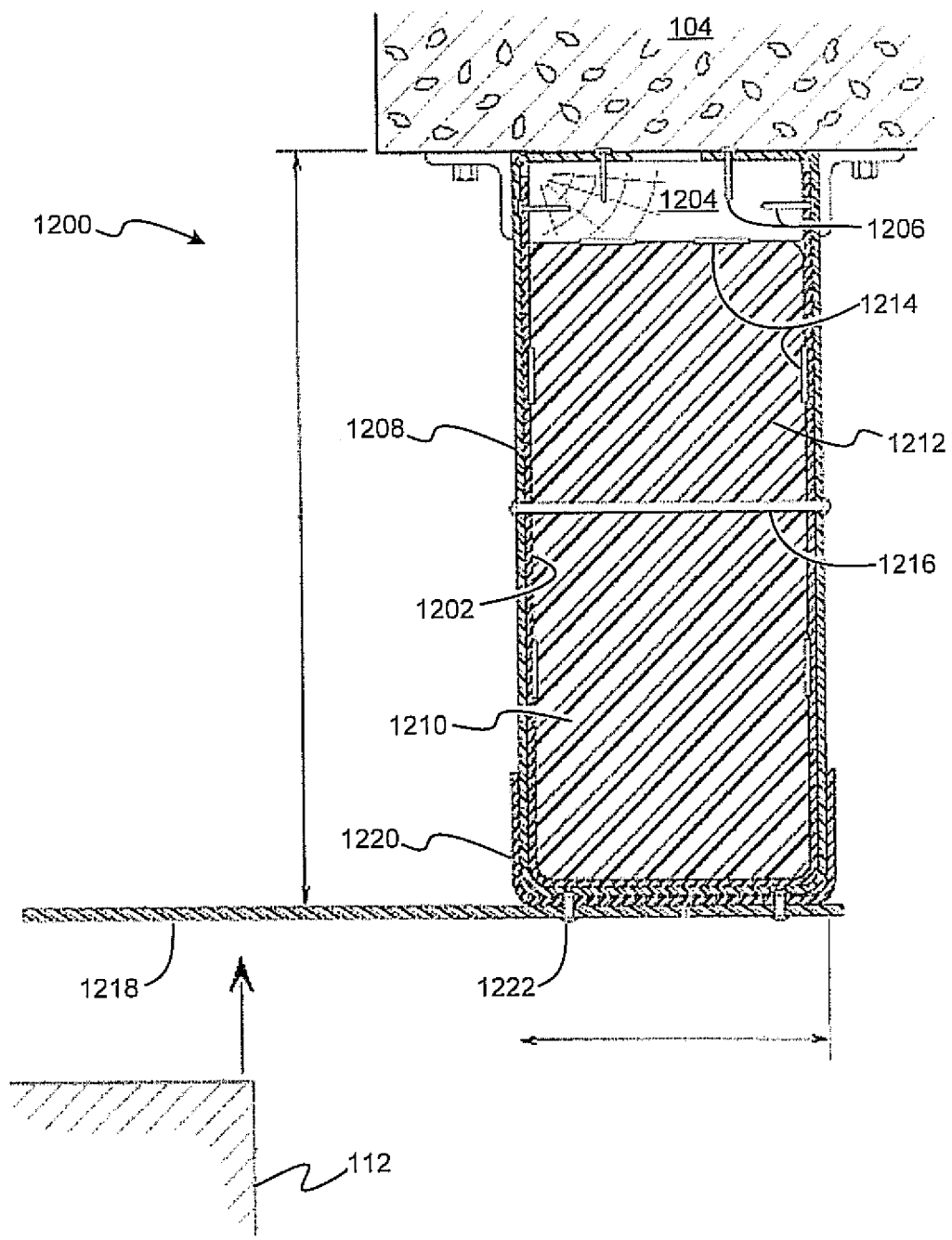
FIG. 12 is a cross-sectional view of another example flexible structure that may be used to implement the side members of the example dock shelter of FIG. 1.

FIG. 12 is a cross-sectional view of another example flexible structure 1200 that may be used to implement the side members 114 and 116 of the example dock shelter 100 of FIG. 1. The example flexible structure 1200 includes a flexible thin-walled or sheet-like member 1202 that is fixed to a backer structure 1204 via mechanical and/or chemical fasteners 1206 (e.g., nails, screws, bolts, glue, etc.). The flexible thin-walled member 1202 may be made of a substantially unitary sheet of flexible material such as, for example, a high molecular weight polyethylene, or any other suitable polymeric or metallic material. As with the flexible structures discussed above, the flexible structure 1200 is configured to have a cross-sectional geometry that provides sufficient rigidity to enable the flexible structure 1200 to be cantilevered out an appreciable distance from the wall 104.

The flexible structure 1200 may include an outer layer 1208, which may be made of vinyl, a woven material such as, for example, a coated fabric, or any other suitable material. The outer layer 1208 may provide improved resistance to environmental conditions (e.g., moisture, ultraviolet radiation, abrasion resistance, etc.) and/or may provide desirable aesthetic characteristics.

A compressible member 1210, which may be one or more foam structures or bodies, may be disposed within a cavity 1212 defined at least in part by the flexible thin-walled member 1202. The compressible member 1210 may provide increased rigidity and/or may impart additional resilience and/or shape restorative force to the flexible thin-walled member 1202 and, if present, the outer layer 1208. If used, the compressible member 1210 may be coupled to the flexible thin-walled member 1202 via adhesive strips 1214 or via any other suitable fastener. Additionally, a cross-piece 1216 such as, for example, a bolt, a plastic tie, a rod, a wire, a rope or cord, etc. may be used to prevent or minimize buckling of the sides of the flexible structure 1200, particularly in response to a compressive impact from the vehicle or truck trailer 112.

Figure 13:
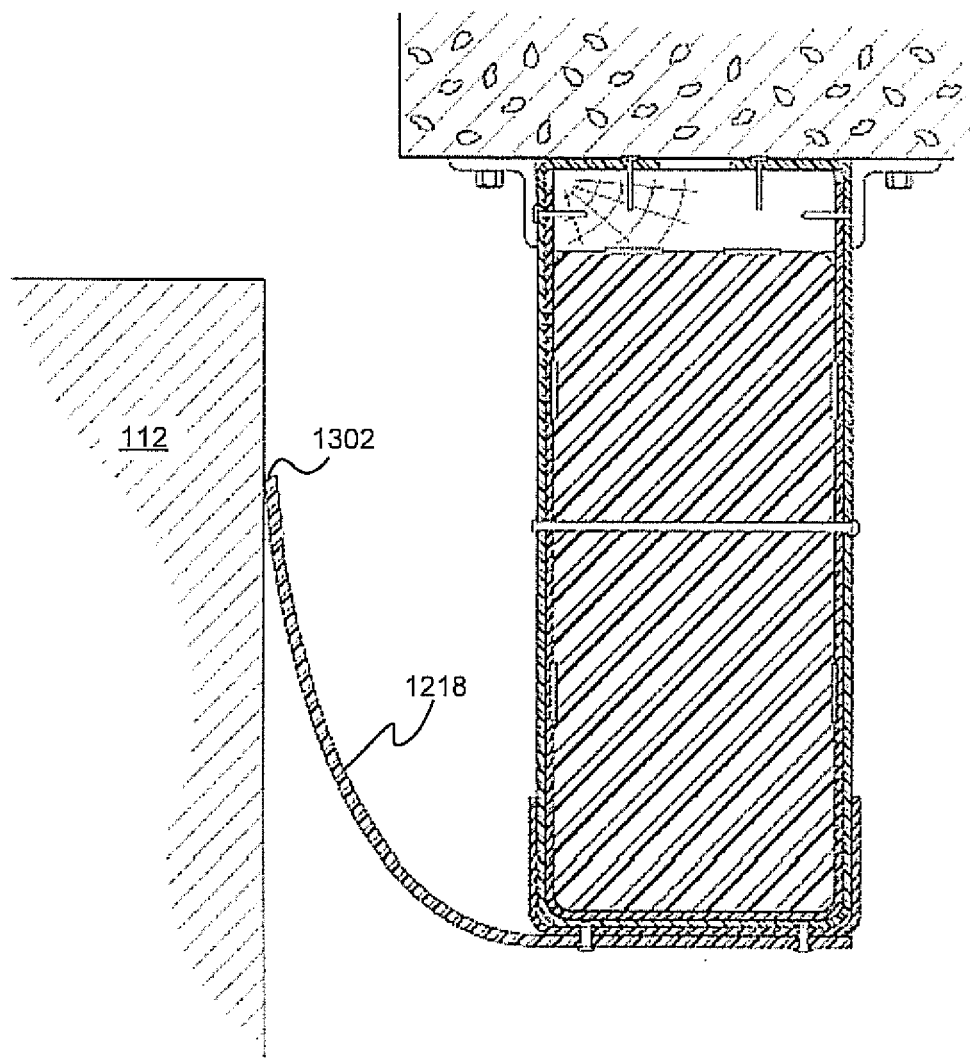
FIG. 13 is a cross-sectional view of the example flexible structure of FIG. 12 depicted in relation to a side of a properly docked vehicle.

A sealing member or side curtain 1218 may be fixed to the flexible structure 1200 via a rigid or semi-rigid sheet of material 1220 and fasteners 1222. As shown in FIG. 13, the seal member or side curtain 1218 sweeps against the side of the backing trailer 112 to form an environmental barrier or seal at an end 1302 of the side curtain 1218.

Figure 14:
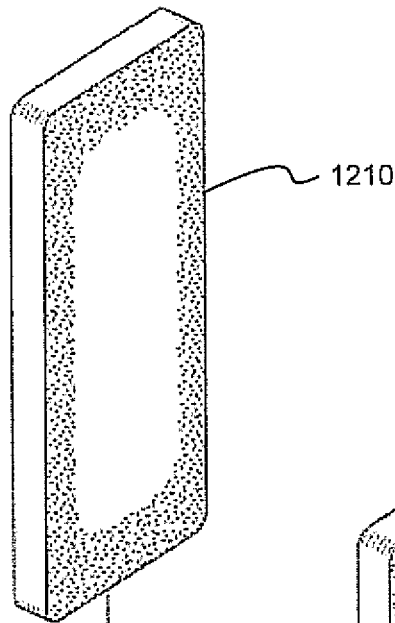
FIGS. 14, 15 and 16 depict an example manner in which a compressible member may be disposed within the example flexible structure of FIG. 12.
Figure 15:
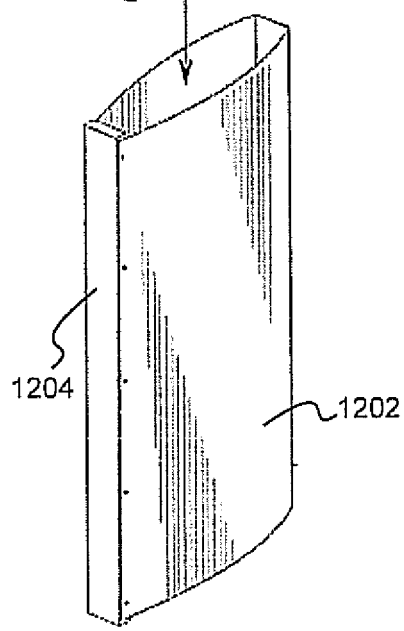
Figure 15:
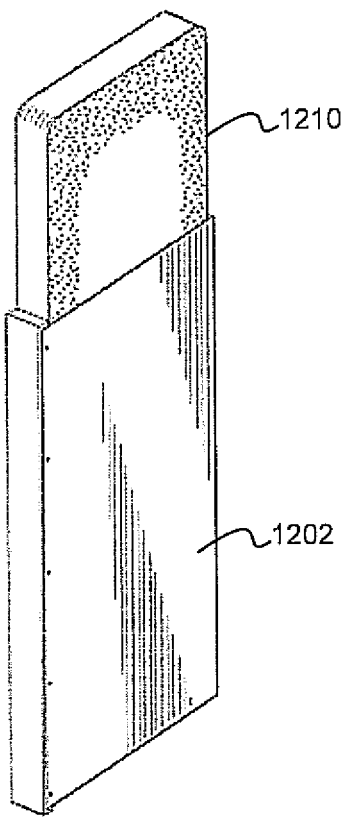
Figure 16:
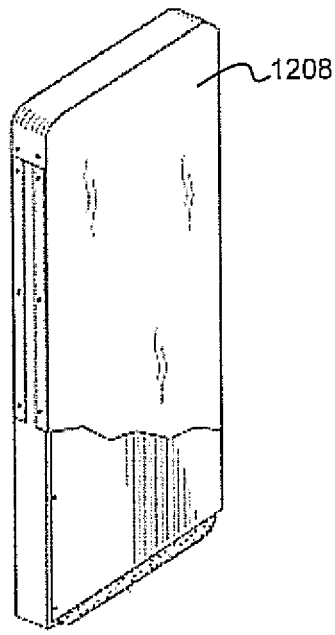

FIGS. 14, 15 and 16 depict one manner in which a compressible member (e.g., the compressible member 1210 of FIG. 12) such as a foam body may be disposed within the example flexible structure 1200 of FIG. 12. Preferably, although not necessarily, the compressible member 1210 is first attached to the backer 1204 and then covered with the flexible thin-walled member 1202 and, if used, the cover 1208.

Figure 17:
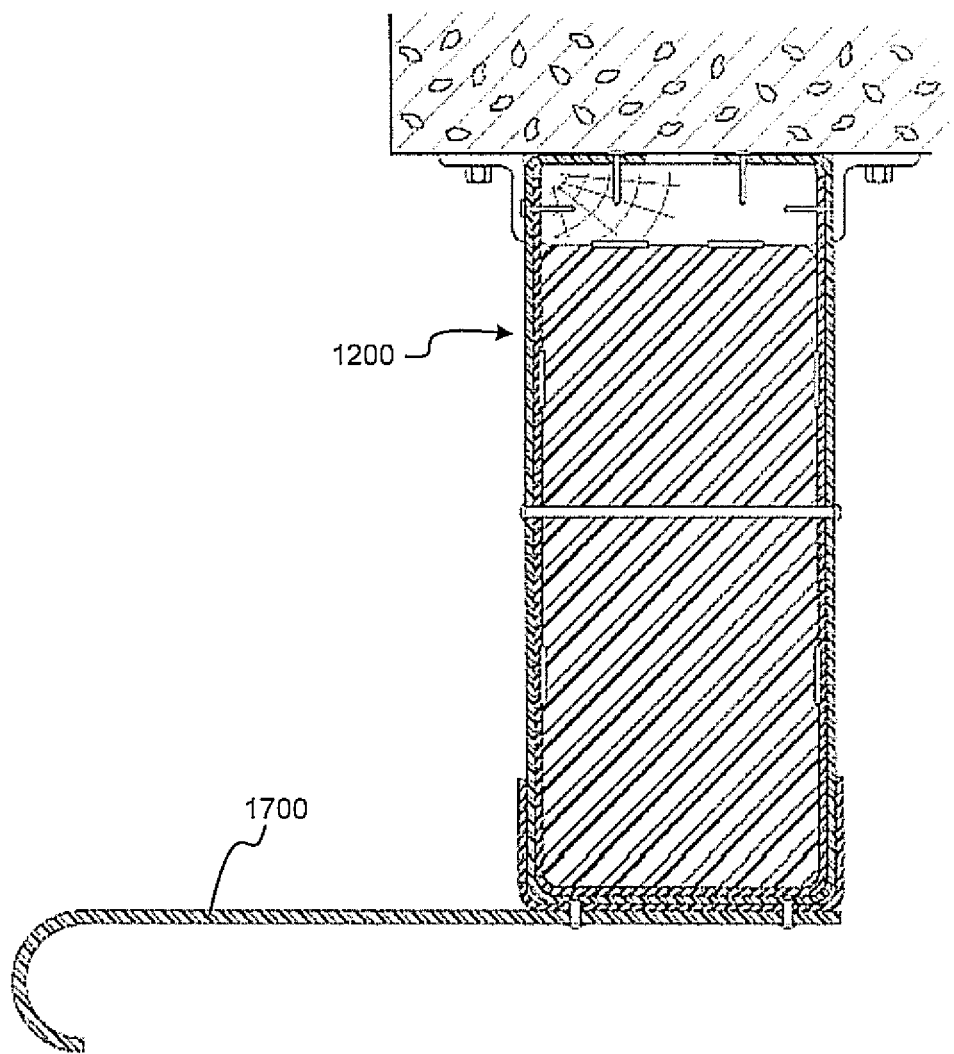
FIG. 17 is a cross-sectional view of the example flexible structure of FIG. 12 with a J-shaped hinge gap cover.
Figure 18:
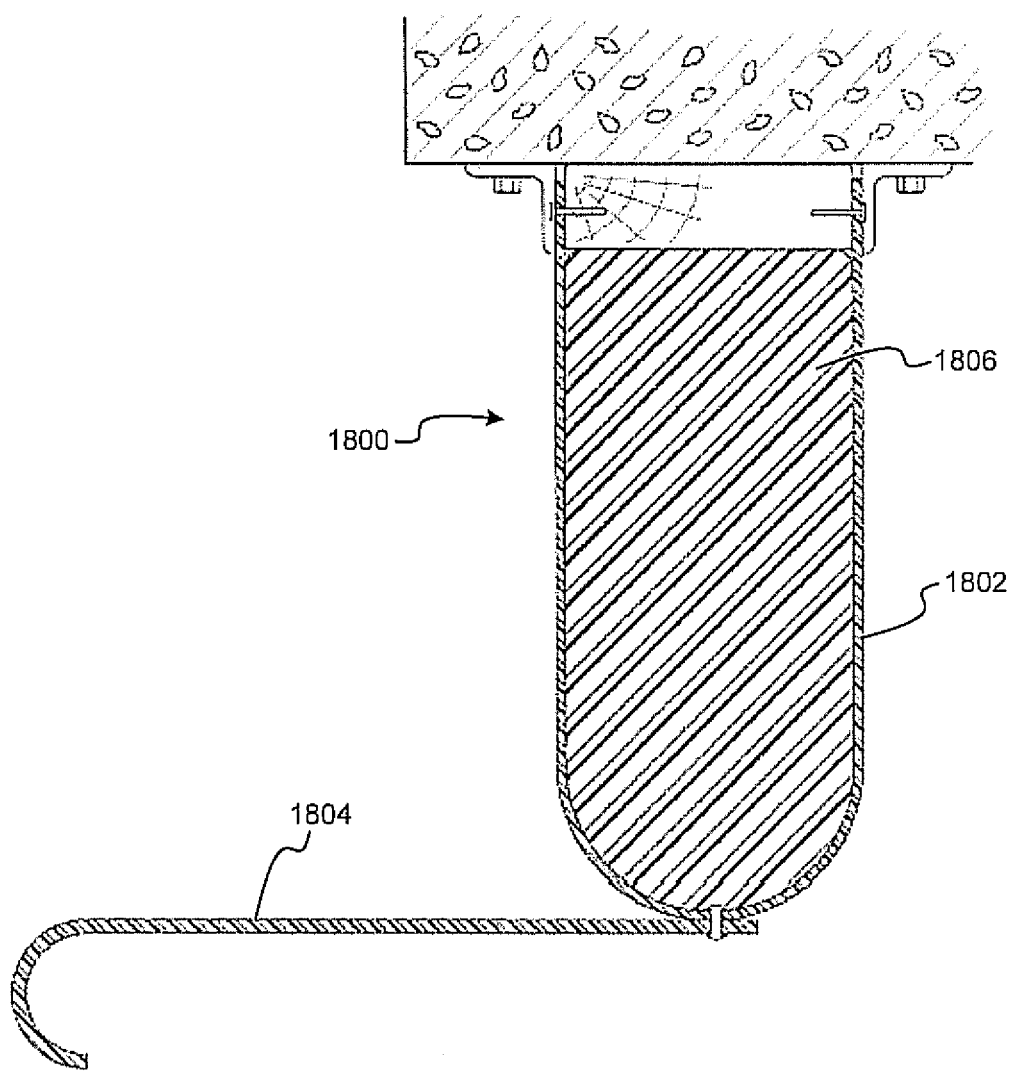
FIG. 18 is a cross-sectional view of another example flexible structure that may be used to implement the example dock shelter of FIG. 1.

FIG. 17 is a cross-sectional view of the example flexible structure 1200 of FIG. 12 with a J-shaped seal member or hinge gap cover or hook 1700. FIG. 18 is a cross-sectional view of another example flexible structure 1800 that may be used to implement the example dock shelter 100 of FIG. 1. The example flexible structure 1800 uses a flexible thin-walled member 1802 and a J-shaped hinge gap cover or hook 1804. A compressible member (e.g., foam core or body) 1806 may be disposed within the example flexible structure as depicted in FIG. 18.

Figure 19:
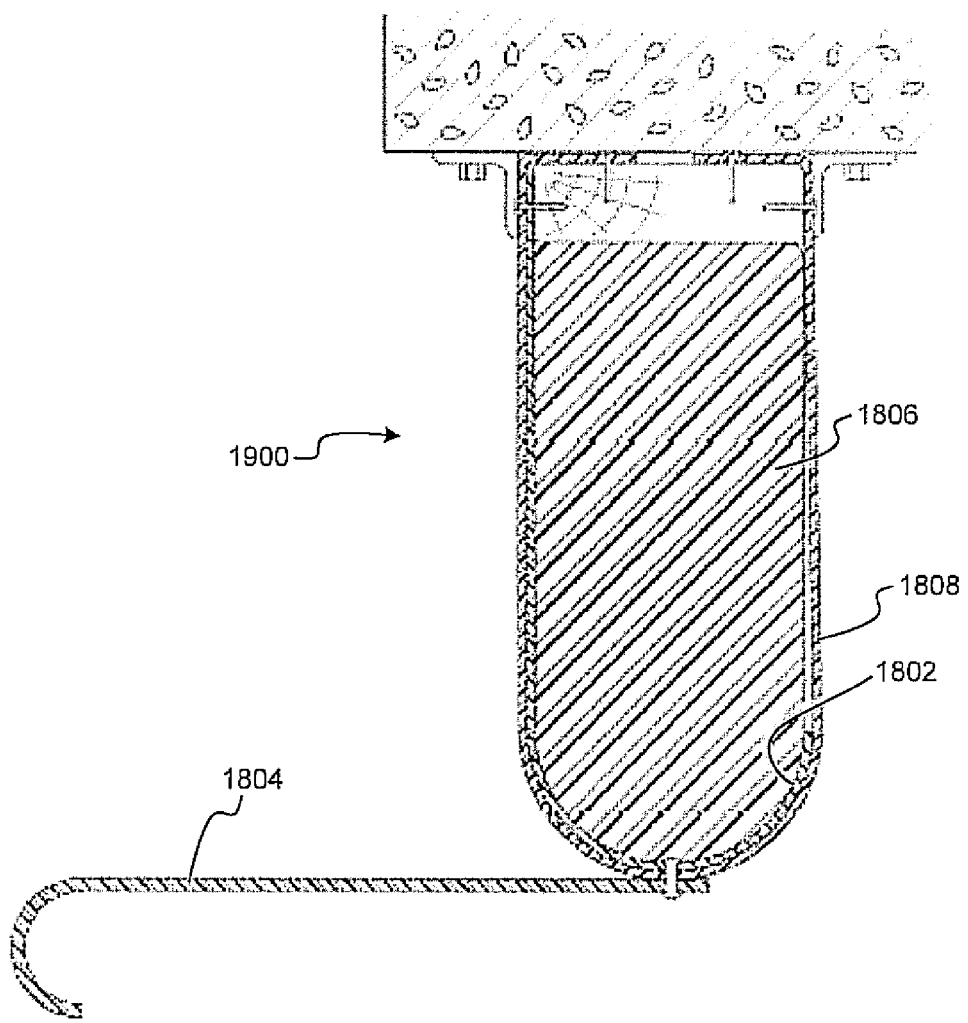
FIG. 19 is a cross-sectional view of yet another example flexible structure that may be used to implement the example dock shelter of FIG. 1.

FIG. 19 is a cross-sectional view of yet another example flexible structure 1900 that may be used to implement the example dock shelter 100 of FIG. 1. The flexible structure 1900 is similar to the structure 1800 shown in FIG. 18 except the structure 1900 includes an outer or cover layer 1808.

Figure 20:
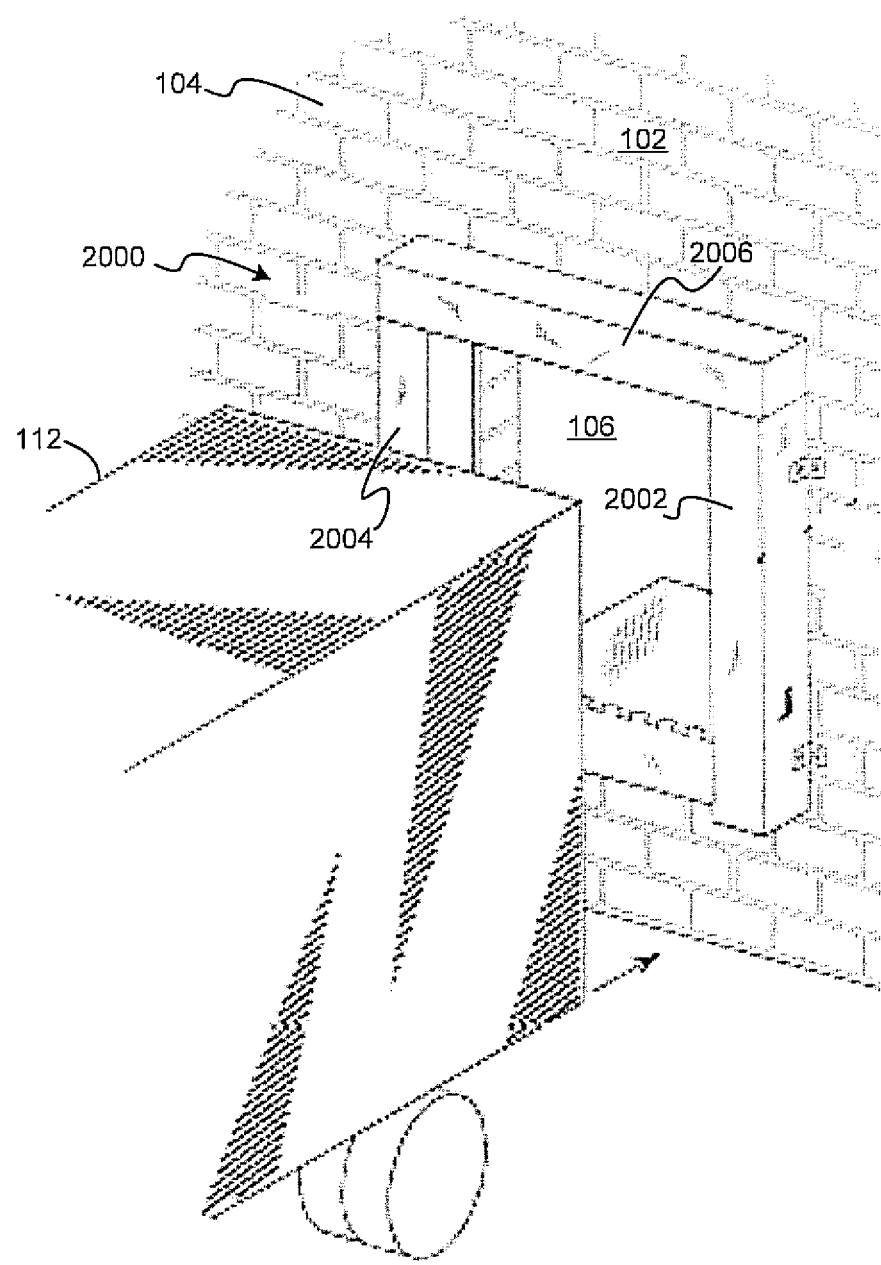
FIG. 20 depicts an example dock seal that may be implemented using the flexible structures described herein.
Figure 21:
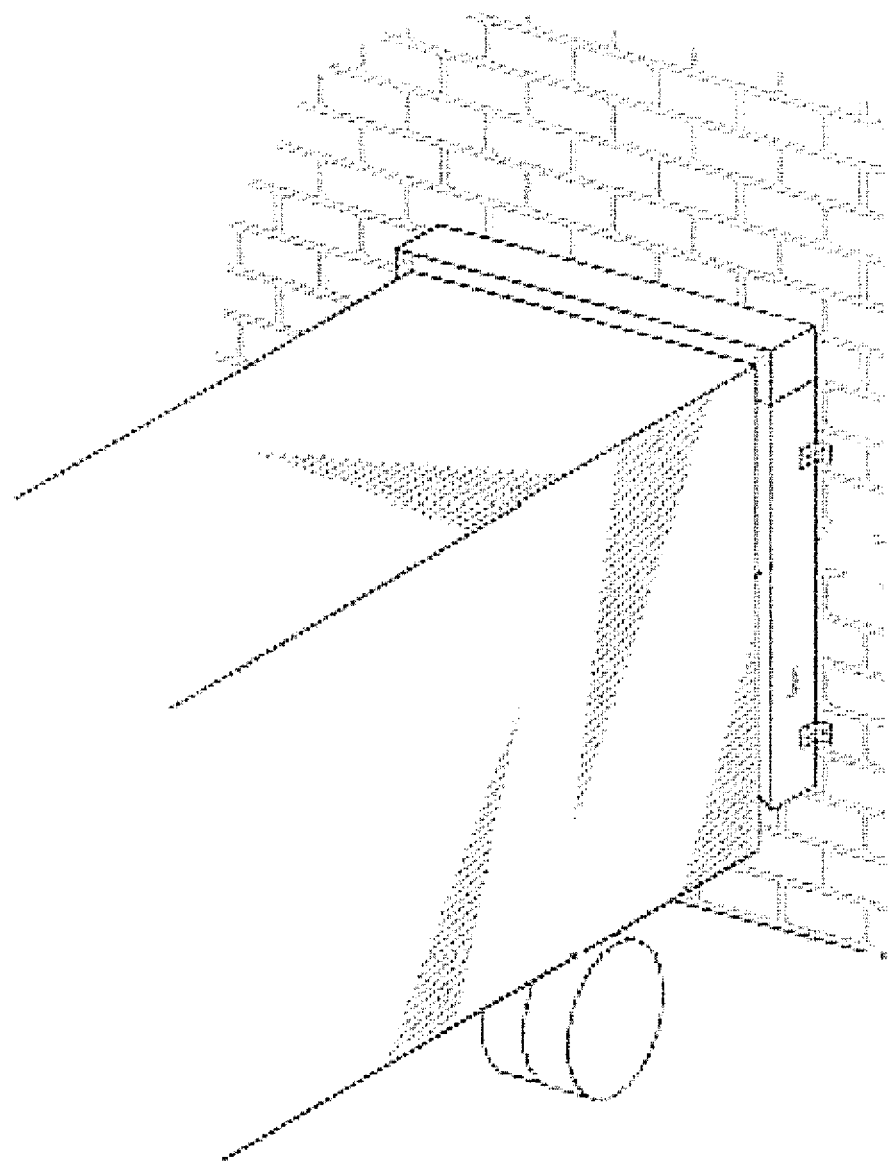
FIG. 21 depicts the manner in which a vehicle may be backed into the example dock seal of FIG. 20.

FIG. 20 depicts an example dock seal 2000 that may be implemented using the flexible structures described herein. The dock seal 2000 includes side seal members 2002 and 2004 and a header seal member 2006. The seal members 2002, 2004 and 2006 cooperate to surround the peripheral portion of the opening 106 and are configured to form a seal against the top and lateral side edges of the rear portion of the trailer 112 when the trailer is backed into the dock seal 2000 as depicted, for example, in FIG. 21.

Figure 22:
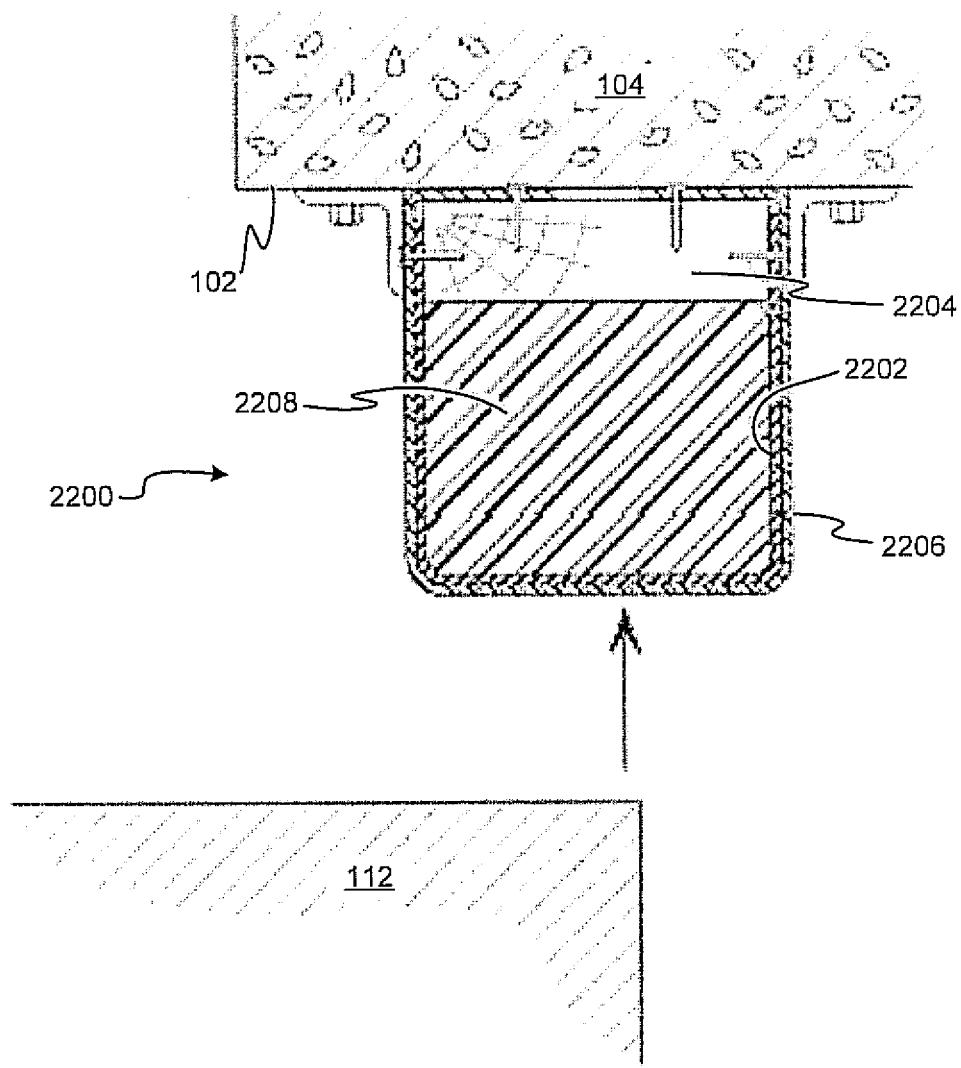
FIG. 22 is a cross-sectional view of an example flexible structure that may be used to implement the example dock seal of FIG. 20.

FIG. 22 is a cross-sectional view of an example flexible structure 2200 that may be used to implement one or more of the seal members 2002, 2004 and 2006 of the example dock seal 2000 of FIG. 20. The example flexible structure 2200 includes a flexible thin-walled member 2202 attached to a backer 2204 structure. The cross-sectional geometry defined by the flexible thin-walled member 2202 provides sufficient rigidity to enable the flexible structure 2200 to be cantilevered out over an appreciable distance from the wall 104 without any substantial (e.g., perceptible) sagging (e.g., along the longitudinal axis of the structure 2200). As with the other example flexible structures described herein, the flexible thin-walled member 2202 may be made of a flexible polymeric material such as a high molecular weight polyethylene or any other suitable material(s). An optional outer or cover layer 2206 and an optional compressible member 2208 (e.g., a foam core) may also be used.

Figure 23:
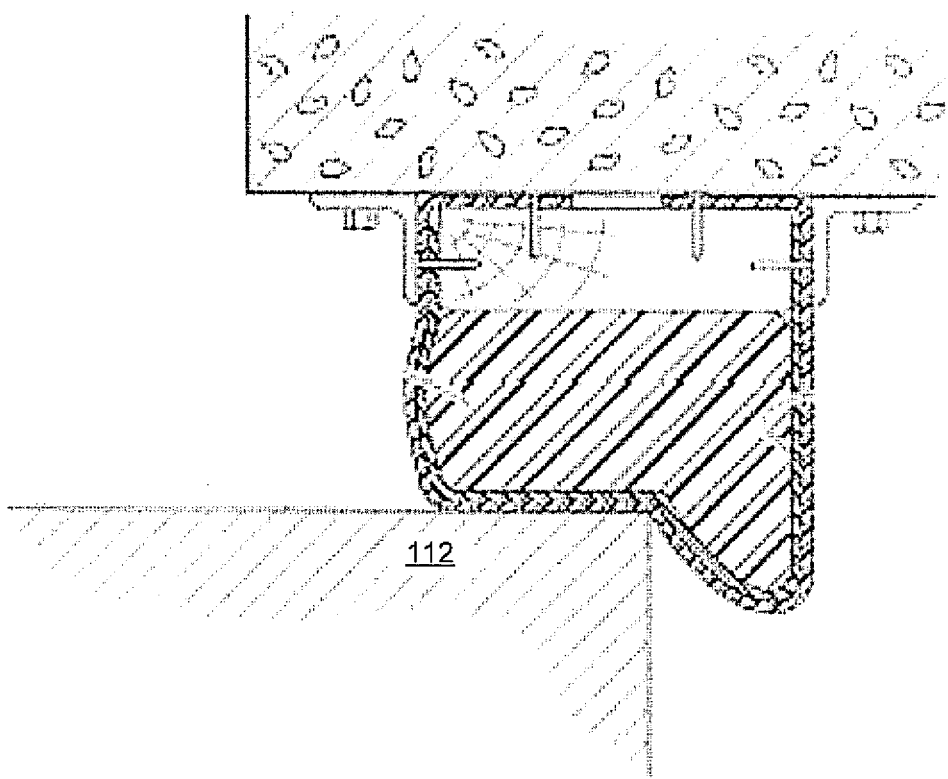
FIG. 23 is a cross-sectional view of the example flexible structure of FIG. 22 depicted in an impacted state.
Figure 24:
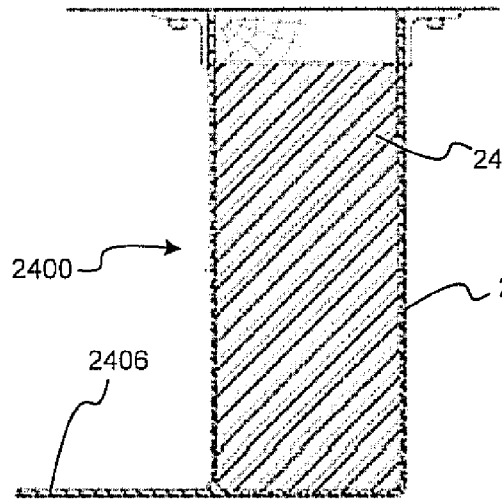
FIGS. 24, 25, 26 and 27 illustrate further examples of flexible structures that may be used to implement the example dock shelter of FIG. 1 and/or the example dock seal of FIG. 20.
Figure 25:
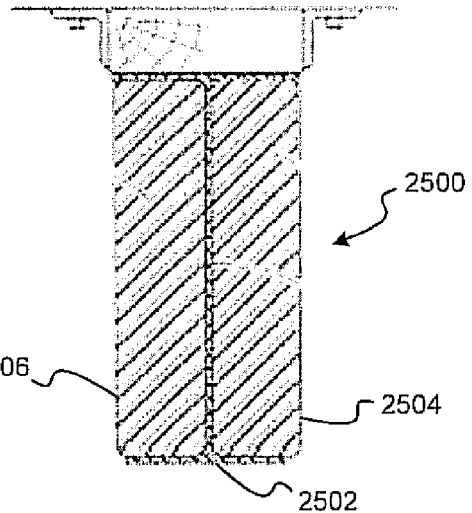
Figure 26:
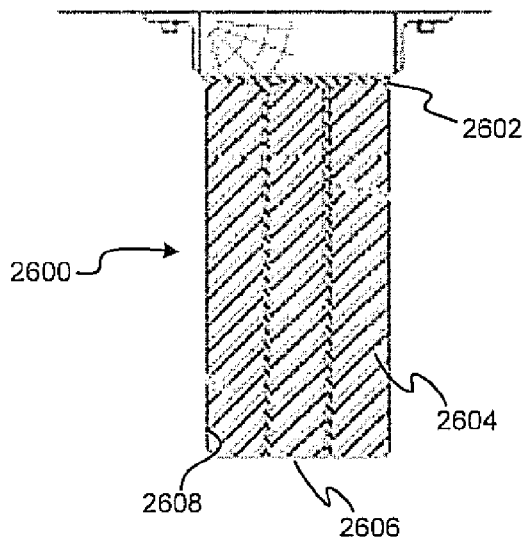
Figure 27:
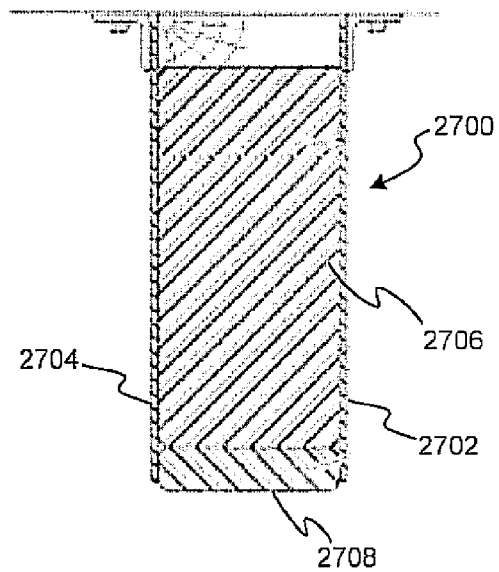

FIG. 23 is a cross-sectional view of the example flexible structure 2200 depicted in a condition in which the trailer 112 has impacted (i.e., is docked properly against) the structure 2200.

FIGS. 24, 25, 26 and 27 are further examples of flexible structures 2400, 2500, 2600 and 2700 that may be used to implement the example dock shelter 100 of FIG. 1 and/or the example dock seal 2000 of FIG. 20. The structures 2400, 2500, 2600 and 2700 have respective flexible thin-walled members 2402, 2502, 2602 and 2702, 2704, respectively.

These members define cross-sectional geometries that provide sufficient rigidity to enable the structures 2400, 2500, 2600 and 2700 to be cantilevered out an appreciable distance from a building wall without any substantial (e.g., perceptible) sagging (or substantial distortion of the respective cross-sectional geometries) along the longitudinal axes of the structures 2400, 2500, 2600 and 2700. Compressible members (e.g., foam structures) 2404, 2504, 2506, 2604, 2606, 2608 and 2706 may be used to increase the rigidity and/or to impart additional shape restorative force to the structures 2400, 2500, 2600 and 2700. The structure 2700 additionally includes a foam pad 2708 for sealingly engaging the rear edge of a trailer and the structure 2400 includes an integral seal member or side curtain 2406.

As can be appreciated from the foregoing, the example structures described herein may be used to provide a dock seal or shelter with flexible side members that consume minimal building wall space, are fully impactable, do not encroach on a rear vehicle opening when compressed, and which can be extended (e.g., cantilevered) an appreciable distance from the building and support side seals or curtains without substantial (e.g., visually perceptible or appreciable) sagging of the side members.

The example side members depicted in FIGS. 12-27 are generally characterized as being composites of foam and thin-walled or sheet-like members. In contrast to the example flexible structures disclosed herein, known composite structures such as foam dock seals and soft-sided dock shelters, which typically utilize a foam body surrounded by a fabric outer layer, obtain most, if not all, of their structural integrity from the foam body. The fabric outer layer used with these known structures provides only moisture protection and abrasion resistance. With the example flexible structures described in connection with FIGS. 12-27, the thin-walled or sheet-like members are selected and configured to provide substantial structural integrity so that the foam (if used) and the sheet-like or thin-walled member cooperate to provide structural integrity to the side member composed thereby.

One benefit of the cooperative relationship between the thin-walled or sheet-like members and the foam described in connection with the examples of FIGS. 12-27 is that the size and amount (e.g., density) of foam required (if any) can be substantially reduced compared to that used with the known fabric and foam structures noted above. For example, with the examples of FIGS. 12-27, owing to the structural properties of the thin-walled or sheet-like members used in these examples, a given side curtain structure can be supported using significantly less foam than would be required with known fabric and foam side members.

Although certain methods, apparatus and articles of manufacture have been described herein, the scope of coverage of this patent is not limited thereto. To the contrary, this patent covers all embodiments fairly falling within the scope of the appended claims either literally or under the doctrine of equivalents.

What is claimed is:

1. A flexible panel assembly for use at a loading dock, comprising:
    a rigid backer to couple the flexible panel assembly to a loading dock wall; and
    a flexible self-supporting structural sheet-shaped member being substantially unitary and having a first side, a front side, and a second side opposite the first side, the front side coupling the first side and the second side, the first side and the front side defining a first corner and the second side and the front side defining a second corner, the flexible self-supporting structural sheet-shaped member having sufficient rigidity to enable the front side to be cantilevered from the rigid backer by at least a distance defined by the first side without substantial sagging and without the first corner and the second corner being attached to a support structure, the first side, the second side and the front side defining an empty cavity when the flexible self-supporting structural sheet-shaped member is coupled to the rigid backer.

2. A flexible panel assembly as defined in claim 1, wherein the flexible self-supporting structural sheet-shaped member comprises a metallic material.

3. A flexible panel assembly as defined in claim 1, wherein the flexible self-supporting structural sheet-shaped member comprises a polymeric material.

4. A flexible panel assembly as defined in claim 3, wherein the polymeric material is a high molecular weight polyethylene.

5. A flexible panel assembly as defined in claim 1, wherein a cross-sectional shape or profile of the flexible self-supporting structural sheet-shaped member is substantially U-shaped when the flexible self-supporting structural sheet-shaped member is coupled to the rigid backer.

6. A flexible panel assembly as defined in 1, further comprising at least one compressible member positioned in the cavity of the flexible self-supporting structural sheet-shaped member to provide at least one of a shape restorative force or a structural rigidity to the flexible self-supporting structural sheet-shaped member.

7. A flexible panel assembly as defined in claim 6, wherein the at least one compressible member is made of a foam material.

8. A flexible panel assembly as defined in claim 1, further comprising a seal cantilevered from the flexible self-supporting structural sheet-shaped member, the seal being substantially perpendicular relative to the flexible self-supporting structural sheet-shaped member when the seal is coupled to the flexible self-supporting structural sheet-shaped member.

9. A flexible panel assembly as defined in claim 8, wherein the seal is to flex relative to the flexible self-supporting structural sheet-shaped member when an external force is applied to the seal.

10. A flexible panel assembly as defined in claim 8, wherein the seal comprises a vehicle hinge gap cover having a curved member or hoop to engage a rear edge of a vehicle.

11. A flexible panel assembly for use at a loading dock, the flexible panel assembly to be vertically mounted adjacent an opening of a building, the flexible panel assembly comprising:
    a structural self-supporting unitary sheet to be coupled to a wall of the loading dock, the unitary sheet composed of a high molecular weight polyethylene material having sufficient rigidity to provide a self-supporting U-shaped profile defining at least one cavity when the unitary sheet is coupled to the wall and to enable the unitary sheet to be cantilevered from the wall without substantial sagging to the U-shaped profile of the unitary sheet and without additional structural support at an end of the unitary sheet that is to protrude away from the wall;
    a non-self-supporting flexible cover positioned on an outer surface of the unitary sheet, the unitary sheet to support the flexible cover when the flexible cover is positioned on the unitary sheet;
    a compressible core positioned in the cavity, the unitary sheet wrapping around the compressible core, the compressible core to provide at least one of a shape restorative force or a structural rigidity to at least one of the unitary sheet or the flexible cover;

a seal coupled to the unitary sheet, the seal to project away from the unitary sheet in a direction toward a dock opening of the dock wall; and a rigid material positioned between the seal and the unitary sheet to enable the seal to couple to the unitary sheet.

12. A flexible panel assembly as defined in claim 11, wherein the compressible member is made of a foam material.

13. A flexible panel assembly as defined in claim 11, wherein the unitary sheet defines a first longitudinal edge and a second longitudinal edge, the first and second longitudinal edges being substantially parallel with respect to the wall when the unitary sheet is coupled to the wall.

14. A flexible panel assembly as defined in claim 13, further comprising a rigid elongate member to couple the unitary sheet to the wall, the first and second longitudinal edges of the unitary sheet to attach to the rigid member via fasteners, wherein the unitary sheet includes a third longitudinal edge spaced apart from the first and second longitudinal edges, the third longitudinal edge being detached from a frame defined by the rigid elongate member, the third longitudinal edge being self-supported without additional structural support and is cantilevered from the wall without substantial sagging to the shape of the unitary sheet.

15. A flexible panel assembly for use at a loading dock, comprising:

a rigid backer defining a first side surface, a second side surface and a rear surface, the rigid backer to couple to a wall of the loading dock such that the rear surface is oriented toward the wall; and a unitary sheet composed of a flexible material, the unitary sheet defining a first longitudinal edge, a second longitudinal edge, and a corner spaced apart from the first and second longitudinal edges, the first longitudinal edge to attach to the first side surface of the backer via a first fastener and a second longitudinal edge to attach to the second side surface of the backer via a second fastener, respectively, the unitary sheet defining an empty cavity when the unitary sheet is coupled to the rigid backer, the unitary sheet having sufficient rigidity to enable the corner of the unitary sheet to be cantilevered from the rigid backer without substantial sagging to a shape of the unitary sheet and without additional structural support between the rigid backer and the corner.

16. A flexible panel assembly of claim 15, further comprising a seal coupled to the corner of the unitary sheet via a rigid sheet and a third fastener, the seal to project away from the unitary sheet in a direction toward a dock opening of the dock wall.

17. A flexible panel assembly of claim 15, wherein the unitary sheet comprises a first side and a second side when the first and second longitudinal edges are coupled to the respective first and second side surfaces of the backer, and further comprising a cross-bar extending between the first and second sides of the unitary sheet.

18. A flexible panel assembly of claim 11, wherein the unitary sheet protrudes approximately two feet away from the wall without substantial sagging to the shape of the unitary sheet and without additional structure support.

19. A flexible panel assembly as defined in claim 1, wherein the sheet-shaped member has an inner surface defining a first longitudinal edge and a second longitudinal edge, the first and second longitudinal edges to couple to the rigid backer.

20. A flexible panel assembly as defined in claim 19, wherein the first longitudinal edge and the first corner define therebetween the first side, the second longitudinal edge and the second corner define therebetween the second side, and the first and second corners define therebetween the front side of the flexible self-supporting sheet-shaped member.

21. A flexible panel assembly as defined in claim 1, wherein the flexible panel assembly does not include any structural support between the rigid backer and the front side.

* * * * *